(12) United States Patent
Mathiowitz et al.

(10) Patent No.: US 6,696,075 B2
(45) Date of Patent: Feb. 24, 2004

(54) LIQUID CRYSTALLINE POLYMERS

(75) Inventors: Edith Mathiowitz, Brookline, MA (US); Jules S. Jacob, Taunton, MA (US); Yong S. Jong, Providence, RI (US); Donald E. Chickering, Framingham, MA (US); Edwin E. Edwards, Providence, RI (US)

(73) Assignee: Brown University Research Foundation, Providence, RI (US)

( * ) Notice: Subject to any disclaimer, the term of this patent is extended or adjusted under 35 U.S.C. 154(b) by 0 days.

(21) Appl. No.: 10/231,723

(22) Filed: Aug. 30, 2002

(65) Prior Publication Data

US 2003/0228367 A1 Dec. 11, 2003

Related U.S. Application Data

(62) Division of application No. 09/523,887, filed on Mar. 13, 2000, now Pat. No. 6,465,002.

(51) Int. Cl.[7] .............................. A61F 13/00; A61K 9/40

(52) U.S. Cl. ........................ 424/426; 424/422; 424/423; 424/489; 514/771.1

(58) Field of Search ................................ 424/426, 422, 424/423, 489; 514/772.1

(56) References Cited

U.S. PATENT DOCUMENTS

| | | |
|---|---|---|
| 4,096,227 A | 6/1978 | Gore |
| 4,668,760 A | 5/1987 | Boudreaux, Jr. et al. |
| 4,999,348 A | 3/1991 | Cioca et al. |
| 5,150,812 A | 9/1992 | Adams |
| 5,151,272 A | 9/1992 | Engstrom et al. |

(List continued on next page.)

FOREIGN PATENT DOCUMENTS

| | | |
|---|---|---|
| EP | 0 571 681 A1 | 1/1993 |
| EP | 0 620 457 A | 10/1994 |
| EP | 0 644 439 A | 3/1995 |
| WO | WO 98/47487 A1 | 10/1998 |

OTHER PUBLICATIONS

Acierno, et al., *Rheology and Processing of Liquid Crystal Polymers*, pp. 218–249.

(List continued on next page.)

Primary Examiner—Thurman K. Page
Assistant Examiner—Liliana Di Nola-Baron
(74) Attorney, Agent, or Firm—Holland & Knight LLP

(57) ABSTRACT

Methods for inducing a thermoplastic polymer, which can be non-mesogenic, to exhibit liquid crystalline properties have been developed. The method includes the steps of (a) heating the polymer from an initial temperature below its glass transition temperature (Tg) to a temperature greater than its Tg and below its melting temperature (Tm); (b) exposing the polymer to a pressure greater than about 2 metric tons/in$^2$, preferably between about 2 and 10 metric tons/in$^2$, preferably for at least about one minute, while maintaining the temperature greater than its Tg; and (c) cooling the polymer below the Tg while maintaining the elevated pressure. Unlike many prior art transition processes which are reversible, this process provides a liquid crystal state that can be maintained for years at ambient conditions. In a preferred embodiment, the plastics are bioerodible thermoplastic polymers, such as polyanhydrides, some polyesters, polyamides, and polyaromatics. The liquid crystalline polymers can be used in the controlled release or retention of substances encapsulated in the polymers. The polymer can be in a variety of forms including films, film laminants, and microparticles. In a preferred embodiment, the LC polymers are used to encapsulate therapeutic, diagnostic, or prophylactic agents for use in medical or pharmaceutical applications.

13 Claims, 23 Drawing Sheets

U.S. PATENT DOCUMENTS

| | | | |
|---|---|---|---|
| 5,326,848 | A | 7/1994 | Kashimura et al. |
| 5,534,209 | A | 7/1996 | Moriya |
| 5,579,035 | A | 11/1996 | Beiswenger |
| 5,599,555 | A | 2/1997 | El-Nokaly |
| 5,681,624 | A | 10/1997 | Moriya |
| 5,753,259 | A | 5/1998 | Engstrom et al. |
| 5,763,513 | A | 6/1998 | Suzuki et al. |
| 6,027,771 | A | 2/2000 | Moriya |
| 6,465,002 | B1 * | 10/2002 | Mathiowitz et al. ........ 424/426 |

OTHER PUBLICATIONS

Hartmann, et al., "High pressure DTA study on the phase behaviours in some selected plastic and liquid crystals," *Zeitschrift fur Physikalische Chemie* 177: 195–210 (1992).

Hsiao, et al., "Pressure–induced phases in a thermotropic polyester," *Macromolecules* 21: 543–545 (1988).

Hsiao, et al., "Study of thermotropic liquid–crystalline polyester at elevated pressures," *Journal of Polymer Science: Part B: Polymer Physics* 28: 189–202 (1990).

Maeda, et al., "Phase transition of liquid–crystalline polyesters with biphenyl mesogen under high pressures," *Makromol. Chem.* 194: 3123–3134 (1993).

Maeda, et al., "Pressure–induced mesomorphic transition of a liquid crystalline polyester at high temperatures," *Macromolecules* 26: 401–403 (1993).

Noël, "Identification of mesophases exhibited by thermotropic liquid crystalline polymers" in *Polymer Liquid Crystals*, (Blumstein, ed.) Plenum Press: New York, pp. 21–59 (1983).

Plate, et al., *Comb–Shaped Polymers and Liquid Crystals*, Plenum Press: New York, pp. 207–209 (1987).

Rastogi, et al., "Pressure–Induced amorphization and disordering on cooling in a crystalline polymer," *Nature* 353: 55–57 (1991).

Scaldini, et al., "Switching effect and local conductivity in thin films of polydiphenylenephthalide," *J. Appl. Phys.* 77: 3194–3199 (1995).

Sperling, et al., "Polymers in the liquid crystalline state," in *Introduction to Physical Polymer Science*, John Wiley & Sons, Inc.: New York, pp. 279–293 (1992).

Takemura, et al., "Structure and physical properties of high polymers under high pressure," pp. 270–273 (Reprint of a paper read at Nov. 1978 Meeting of Polymer Science in Japan).

Woodward, *Atlas of Polymer Morphology*, Hanser Publishers: New York, pp. 223–225 (1989).

Zhao, et al., "Names, acronyms, classes, and structures of some important polymers," in *Physical Properties of Polymers Handbook*, (Mark, ed.) AIP Press, Woodbury: New York, pp. 29–36 (1996).

* cited by examiner

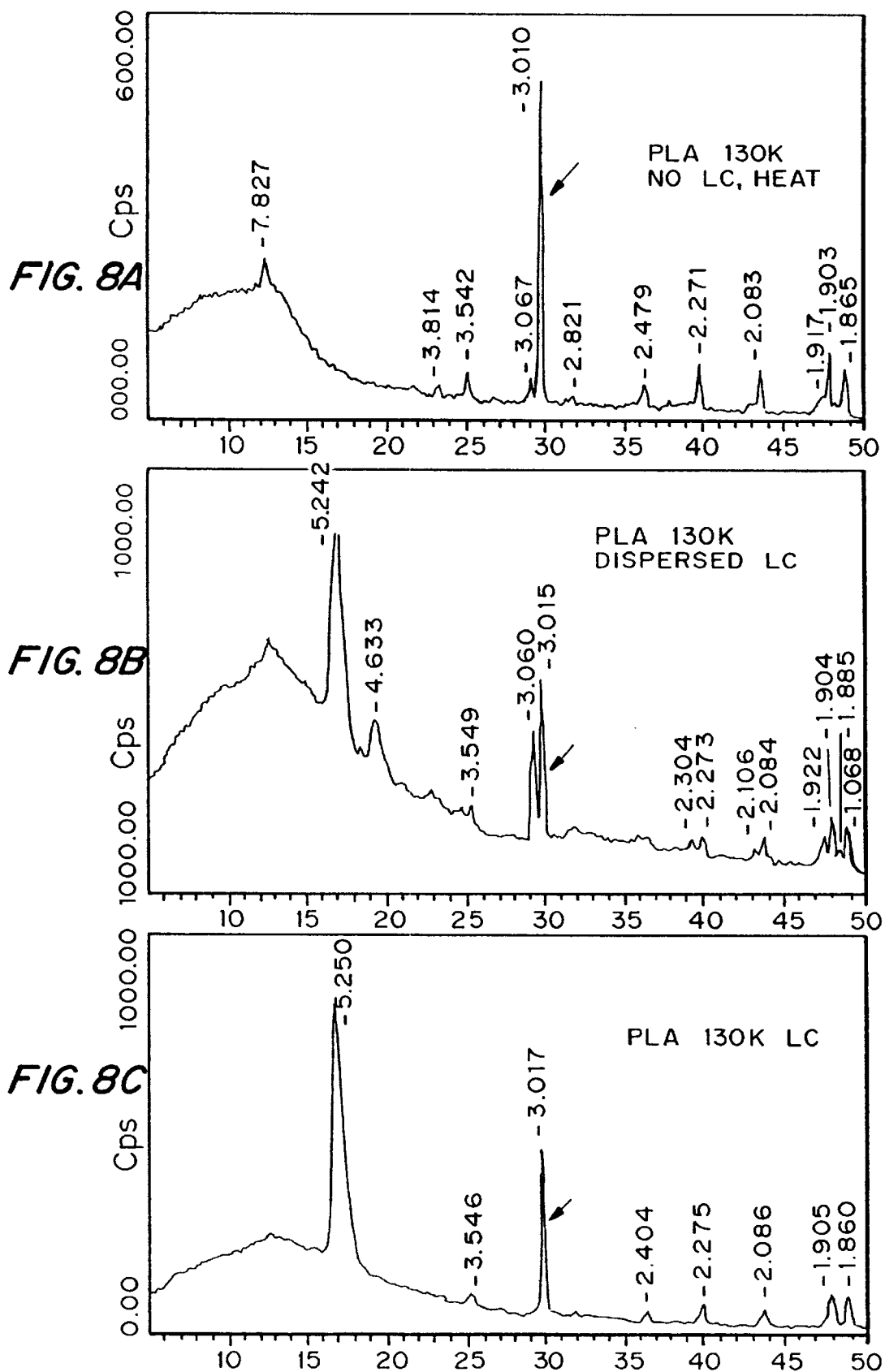

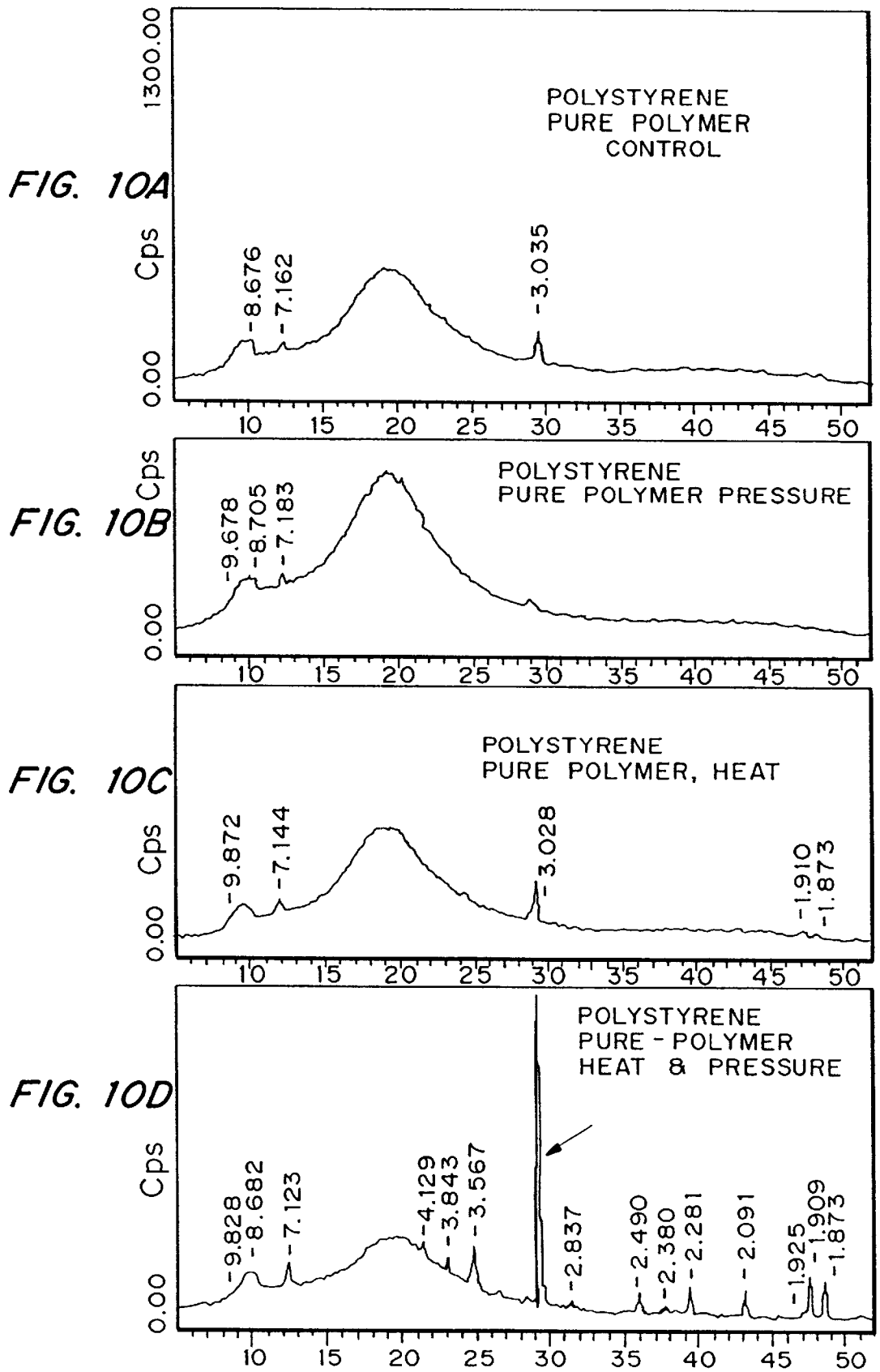

LIQUID CRYSTALLINE POLYMERS

CROSS-REFERENCE TO RELATED APPLICATION

This application is a divisional of U.S. Ser. No. 09/523,887 filed Mar. 13, 2000 and now U.S. Pat. No. 6,465,002.

BACKGROUND OF THE INVENTION

This invention generally relates to liquid crystal compositions, and more specifically to polymeric materials in a liquid crystalline state.

Liquid Crystal Polymers

It has generally been thought that in order for normally flexible polymers to display liquid crystalline characteristics, rod-like or disk-like elements, i.e. mesogens, must be incorporated into their chains. The placement of these mesogens typically controls the type of liquid crystalline ("LC") polymer formed. Polymer liquid crystals (PLCs) generally can be divided into two types: main-chain PLCs and side-chain PLCs. Main-chain polymer liquid crystals are formed when the mesogens are themselves part of the main chain of a polymer. Conversely, side chain liquid crystal polymers are formed when the mesogens are connected as side chains to the polymer by a flexible bridge, or spacer.

Thermoplastic polymers combined with mesogens have been extensively studied because the ordered fluid phases of liquid crystals offer unique properties useful, for example, as precursors to high performance polymeric films, fibers, and injection molded articles. For example, U.S. Pat. No. 4,668,760 to Boudreaux Jr., et al. describes a process that includes synthesizing a liquid crystal polyester, devolatilizing the liquid crystal polyester, and then shaping the devolatilized polyester into an article of manufacture, such as fibers useful in tire cords. These polymers have mostly been aromatic copolyesters, since many polymers, including some aromatic homopolyesters, have melting points too high to form thermotropic mesophases without decomposition.

Temperature and Pressure Induced Phase Changes

Elevated pressure is known to reversibly induce the formation of a liquid crystalline state in mesogenic polymers. For example, Hsiao, et al., *Macromolecules* 21:543–45 (1988) discloses a process of heating a sample of HIQ-20 (a copolyester) above the clearing temperature (342° C.), applying a pressure of up to 6000 bar (0.6 GPa) to the sample, reducing the temperature to the mesophase temperature, maintaining the temperature for 1 hr., and then cooling the sample to room temperature at a rate of 3° C./min. It was found that cooling the mesophase into the solid state under moderate pressure yielded a morphology that differed from that in the solid cooled at ambient pressure. The study was limited to the mesogenic polymer, HIQ-20.

Maeda, et al., *Macromolecules* 28:1661–67 (1995) describes a study on the thermotropic polymer (4,4'-dihydroxybiphenyl) tetradecanedioic acid polyester (PB-12), which is known to exhibit liquid crystalline properties. The phase transition of PB-12 under hydrostatic pressures up to 300 MPa was observed. The typical phase transition of crystal (K)-smectic H ($S_H$)-isotropic melt (I) was observed under hydrostatic pressures up to 90–100 MPa and elevated temperatures. A new smectic phase was formed irreversibly from the usual $S_H$ phase by increasing pressure on a quasi-isothermal process. After heating above the clearing temperature, the sample was supercooled at high pressures, and the glassy $S_B$ phase was found coexistent with the normal crystals at room temperature under atmospheric pressure. Other thermotropic polyesters studied include two homopolymers and the corresponding copolymer based on 4,4'-biphenyldiol as the mesogen and aliphatic dibasic acids containing 7 and 8 methylene groups as flexible spacers (Maeda, et al., *Makromol. Chem,* 194:3123–34 (1993)).

Phase transitions as a function of temperature and pressure have been studied on other select polymers. Rastogi, et al., *Nature* 353 (1991) examined poly(4-methyl-pentene-1), which is crystalline under ambient conditions, and which was found to become reversibly amorphous on increasing pressure in two widely separate temperature regimes (approximately 20° C. and 200° C.). The transformation occurred via liquid-crystal and amorphous phases as pressure or temperature was varied. The liquid crystalline state was not retained when returned to ambient conditions. Polytetrafluoroethylene and polyethylene also have been examined for structure of high pressure phases, as described in Tetuo Takemura, *"Structure and physical properties of high polymers under high pressure"* (Reprint of a paper read at November 1978 Meeting of Polymer Science in Japan) and Plate & Shibaev, *"Comb-Shaped Polymers and Liquid Crystals"* (Cowie, ed.) pp.207–09 (Plenum Press, New York 1987). The references do not indicate retention of a liquid crystalline state in these polymers at ambient temperature after applying pressure.

Efforts to use liquid crystalline materials in controlled release systems are described in U.S. Pat. No. 5,753,259 to Engstrom, et al. These non-polymeric systems include a cubic liquid crystalline phase and purportedly provide a highly reproducible controlled drug release system, in contrast to solutions involving polymers.

PCT WO 98/47487 discloses a drug delivery composition that includes an active substance (e.g., drug) and a fatty acid ester substance capable of forming a liquid crystalline phase in the presence of a liquid medium. In these compositions, which can be mixed with polycarbophiles, the lipid forms a liquid crystalline state, but the polymer itself does not. Furthermore, the requirement of a liquid medium, particularly water, significantly limits the forms and uses of the compositions.

It is therefore an object of this invention to provide non-mesogenic polymers that exhibit liquid crystalline properties at ambient temperatures.

It is a further object of this invention to provide methods for inducing a liquid crystalline state in any thermoplastic polymer, preferably in the substantial absence of water.

It is a further object of this invention to provide methods for inducing a liquid crystalline state in cross-linked polymers.

It is another object of the present invention to provide a liquid crystalline polymer that retains its liquid crystalline state for an extended period-of time, such as several hours or years.

It is another object of this invention to provide non-mesogenic polymer systems for the controlled release of a variety of molecules, including therapeutic and diagnostic agents, as well as cosmetics and fragrances.

It is still a further object of this invention to provide methods for reducing the permeability of various polymers to molecules, such as gases or fragrances, by inducing liquid crystalline properties in the polymers.

It is another object of the present invention to provide compositions including polymers such as high- and/or low-density polyethylene having improved physical or mechanical properties which are useful in various applications.

It is also an object of the present invention to provide methods and articles for displaying information using polymers that exhibit liquid crystalline properties at ambient temperatures.

It is another object of the present invention to provide a method of inducing unique liquid crystalline states in mesogenic polymers.

BRIEF SUMMARY OF THE INVENTION

Methods are provided for inducing a polymer, which can be non-mesogenic or mesogenic, to exhibit liquid crystalline properties. The method includes the steps of (a) heating the polymer from an initial temperature below its glass transition temperature (Tg) to a temperature greater than its Tg and below its melting temperature (Tm); (b) exposing the polymer to a pressure greater than about 28 MPa (2 metric tons/in$^2$), preferably between about 28 and 140 MPa (2 and 10 metric tons/in$^2$), typically for between about 30 seconds and 5 minutes, preferably for at least about one minute, while maintaining the temperature greater than its Tg; and (c) cooling the polymer below the Tg while maintaining the elevated pressure, typically for between about 30 seconds and 5 minutes. Unlike many prior art transition processes which are reversible at ambient conditions, this process produces a liquid crystalline state, or another new state with similar characteristics, that can be maintained for years at ambient conditions, even after removing the pressure.

Methods for identifying polymers having liquid crystals ("LC") or non-LC ordered phases include those known in the art, such as optical pattern or texture observations with a polarizing microscope, differential scanning calorimetry, miscibility or density comparisons, molecular orientations by either supporting surface treatments or external fields, and classical x-ray and x-ray diffraction techniques.

Polymer can be bioerodible or non-bioerodible. Representative non-mesogenic, bioerodible polymers include polylactic acid, polylactide-co-glycolide, polycaprolactones, polyvaleric acid, polyorthoesters, polysaccharides, polypeptides, and certain polyesters. Representative mesogenic, bioerodible polymers include some polyanhydrides and polybutylene terephthalate. Preferred non-mesogenic, non-erodible polymers include polyethylene, polypropylene, polystyrene, and polytherephthalic acid. The polymer can be water-soluble or water-insoluble.

The liquid crystalline polymers described herein can be used in the controlled release or retention of substances encapsulated in the LC polymers. The polymer can be in a variety of forms including films, film laminants, and microparticles. In a preferred embodiment, the LC polymers are used to encapsulate therapeutic, diagnostic, or prophylactic agents for use in medical or pharmaceutical applications. Other substances which can be encapsulated include scents such as perfumes, flavoring or coloring agents, sunscreen, and pesticides.

The methods of inducing liquid crystalline properties in polymer also can be used to improve the permeability of polymers in numerous applications, such as packaging, particularly food and pharmaceutical packaging. The methods similarly can be used to enhance the structural performance of polymeric devices, such prosthetics made of polyethylenes.

BRIEF DESCRIPTION OF THE DRAWINGS

FIG. 2A shows an LC sample (after heat treatment) and FIG. 2B shows a non-LC sample (before heat treatment). The first run of the Differential Scanning Calorimetry (DSC) revealed a glass transition at 2° C. and a broad peak between 129–150° C. which was attributed to the new phase which was probably in equilibrium with the amorphous phase.

FIG. 4A shows the first heating curves and FIG. 4B shows the second heating curves. Note the disappearance of the thermal peaks after the second heat.

FIGS. 8A–8C are graphs showing X-ray diffraction of polylactic acid polymer (PLA) (130 kDa) for PLA with no LC state (8A), PLA with dispersed LC state (8B), and PLA with LC state (8C). Arrows indicate diffraction of the clay material on which the film was supported.

FIGS. 10A–10D are graphs showing X-ray powder diffraction of polystyrene film (120 kDa) for no LC (10A); pure polymer with pressure only, no LC (10B); pure polymer heated with no pressure, no LC (10C); and pure polymer treated with heat and 890 MPa pressure, LC (10D). Arrows indicate diffraction of the clay material on which the film was supported.

Figure 13:
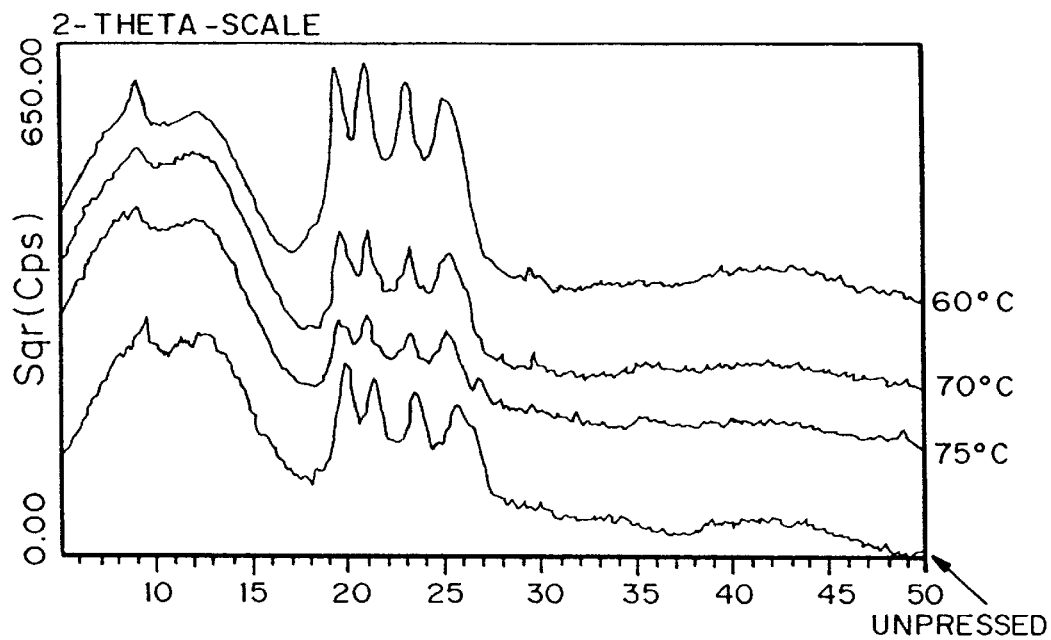
Figure 14A:
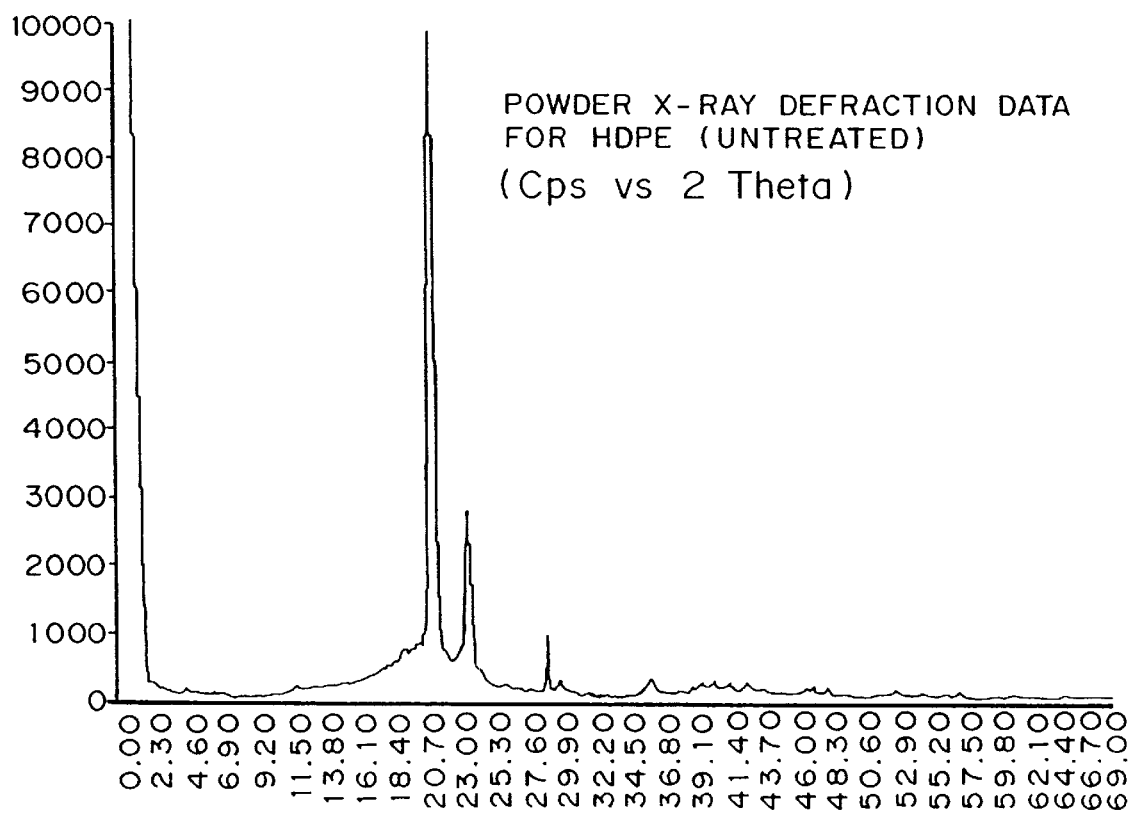
Figure 14B:
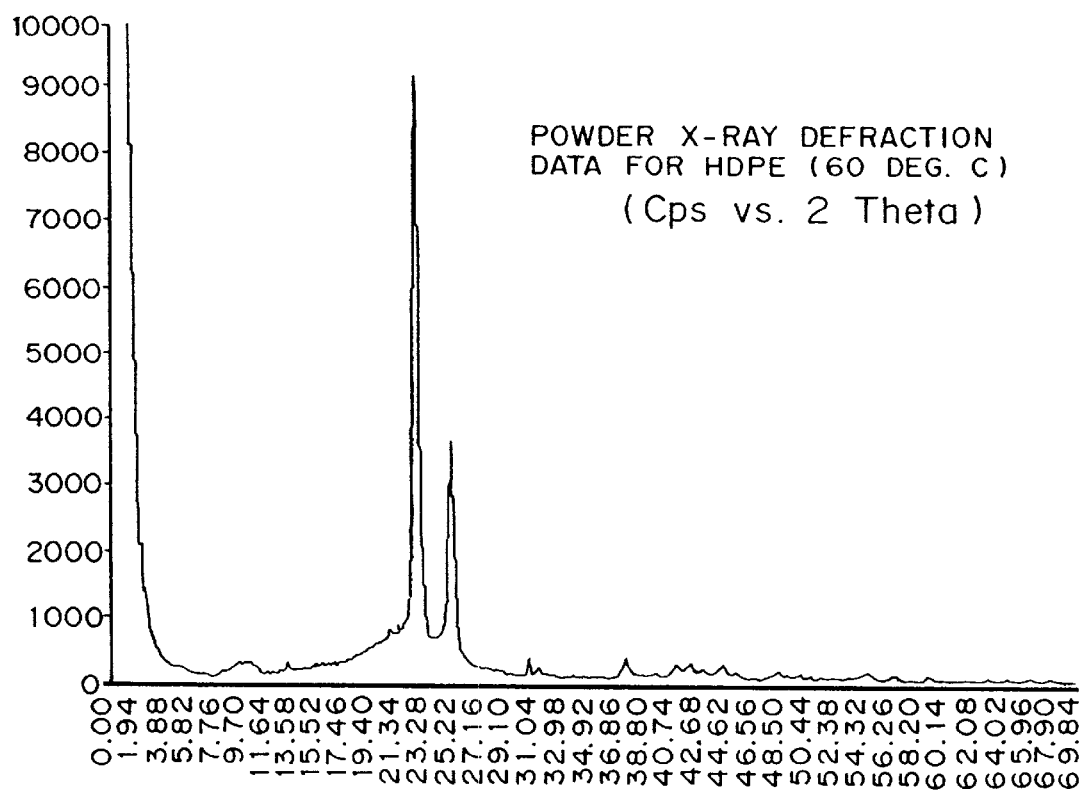
Figure 14C:
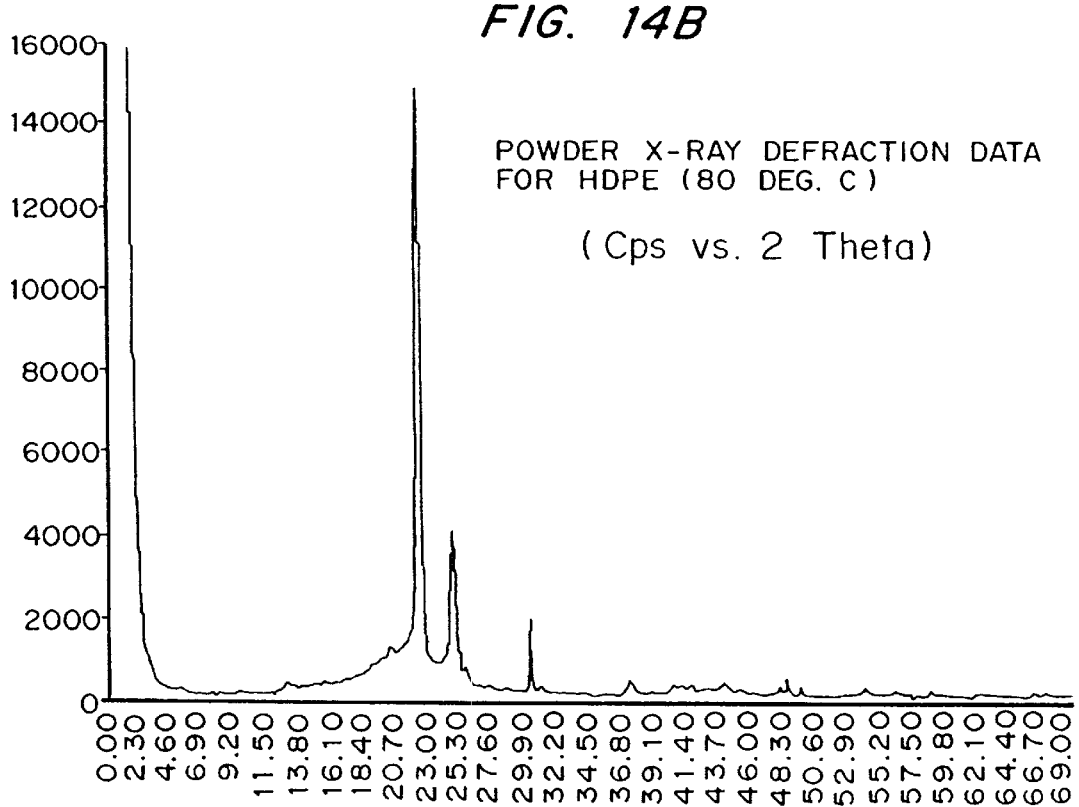
Figure 14D:
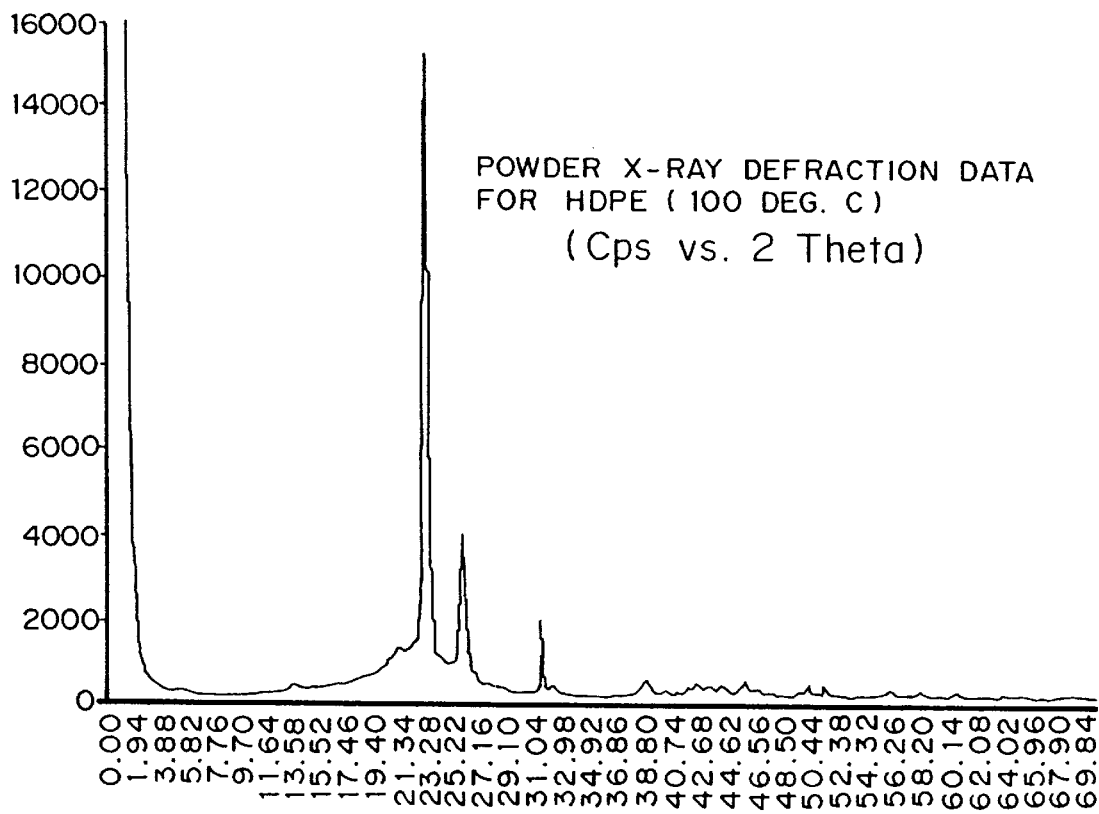
Figure 14E:
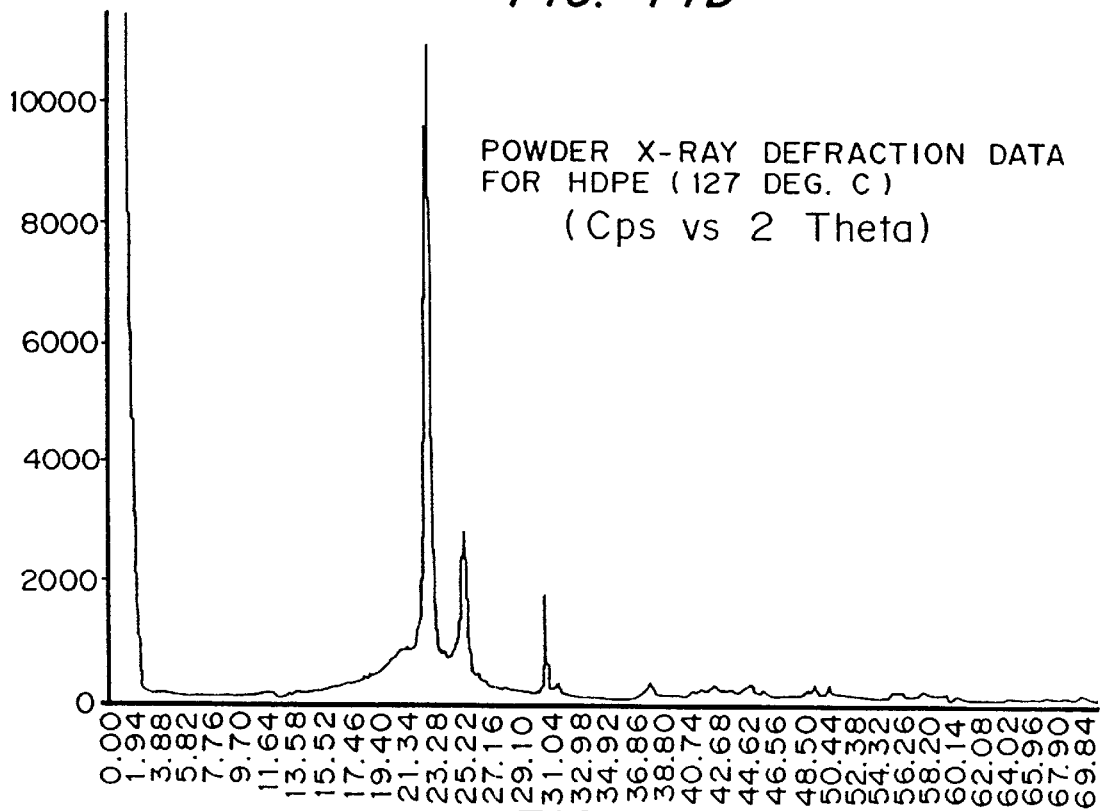

FIG. 13 is a graph showing X-ray powder diffraction of a polyanhydride (polycarboxyphenoxy-propane-co-sebacic acid (20:80)) polymers heated to three different temperatures, 60, 70, and 75° C., and pressed.

FIGS. 14A–14E are graphs showing X-ray powder diffraction of high density polyethylene ("HDPE") films, untreated (14A) and treated with pressure and different temperatures (60° C. (14B), 80° C. (14C), 100° C. (14D), and 127° C. (14E)).

Figure 15A:
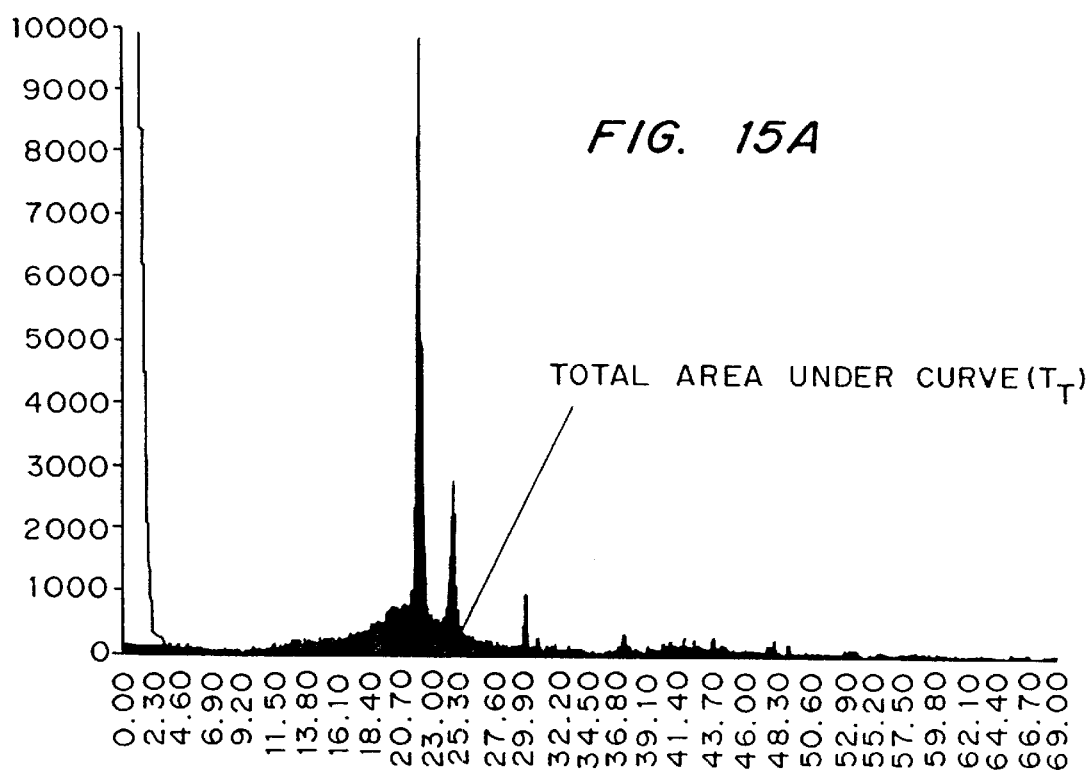
Figure 15B:
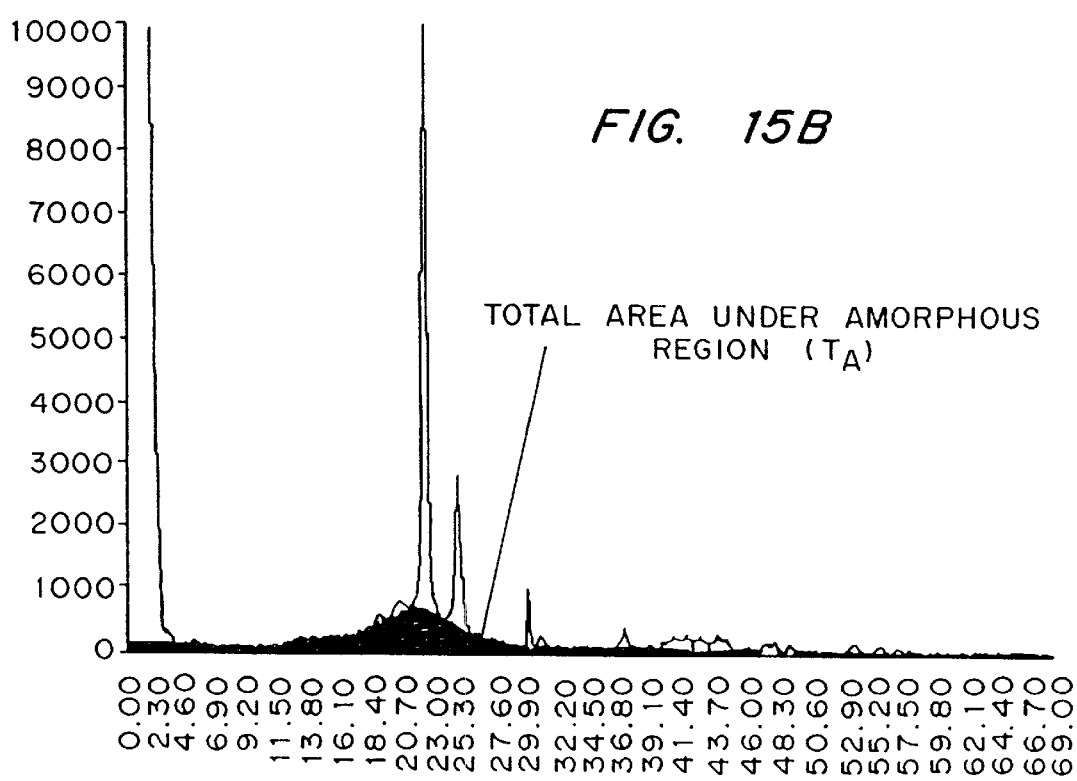

FIGS. 15A–15B are graphs showing X-ray powder diffraction of HDPE films, showing total area under curve and total area under amorphous region for treated HDPE samples.

Figure 16:
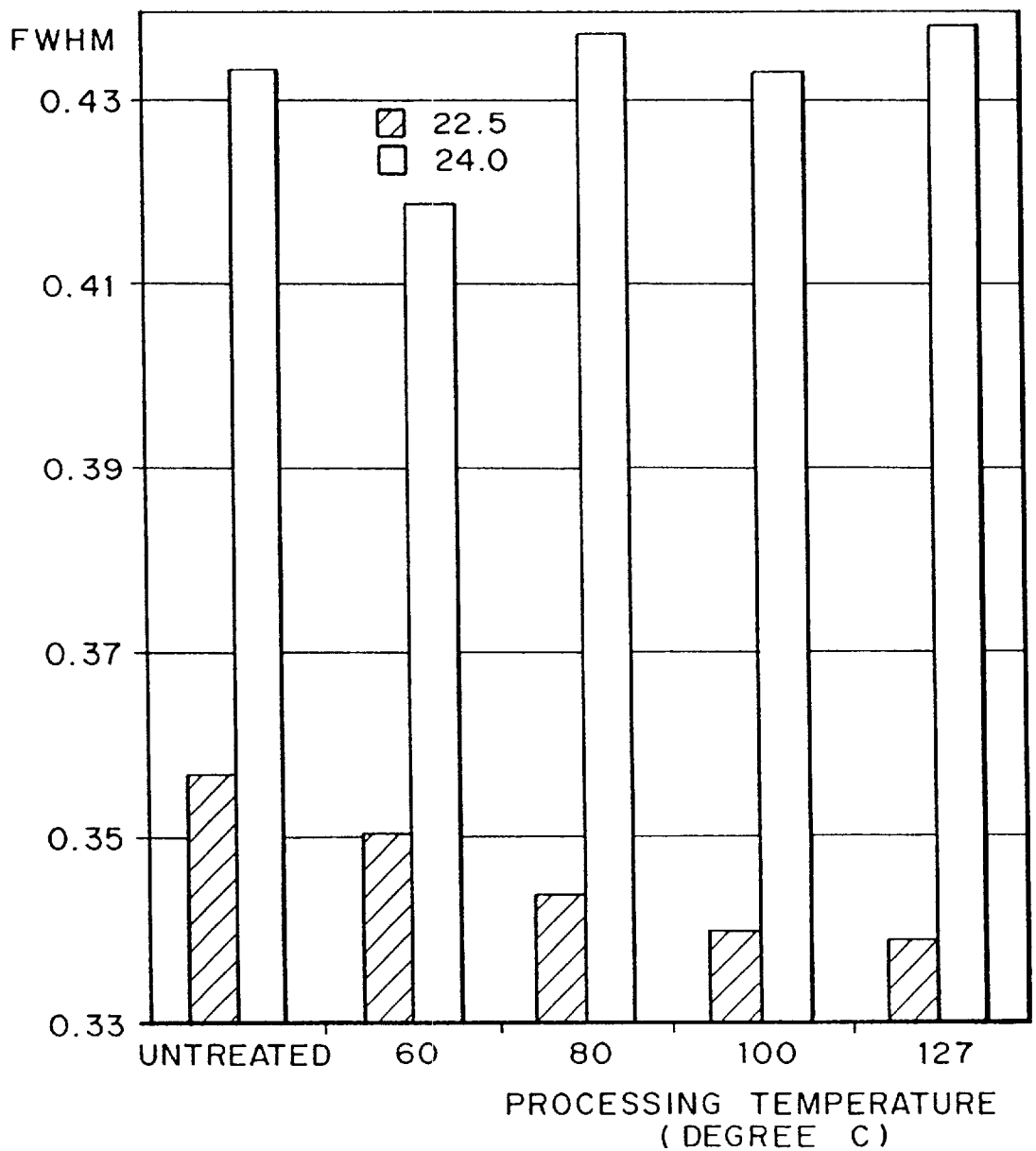

FIG. 16 is a bar graph showing Full Width at Half Maximum Peak Height ("FWHM") for peaks at 22.5 and 24.0 2θ of HDPE samples which have been treated with pressure and different temperatures (60, 80, 100, and 127° C.).

Figure 17:
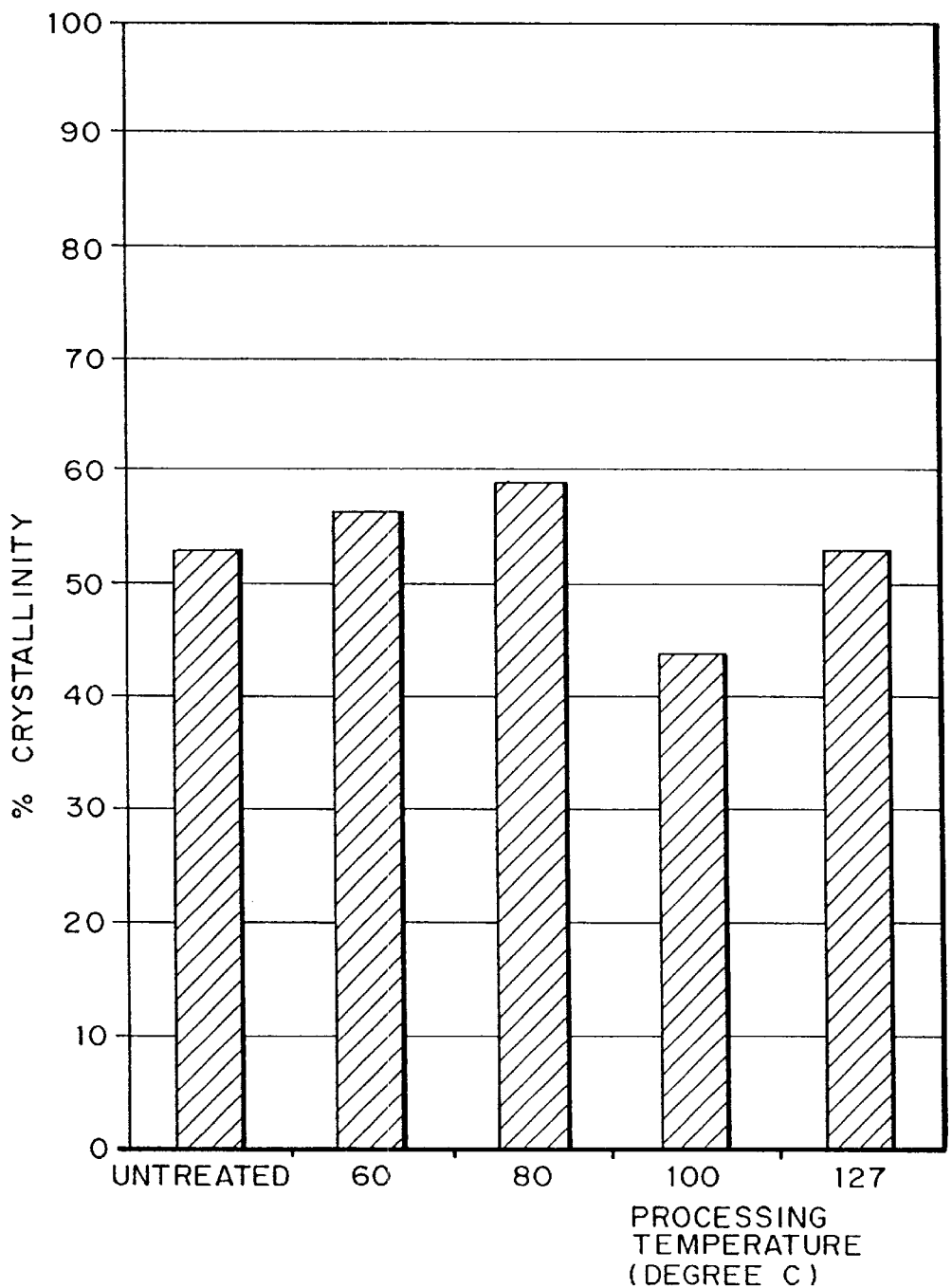

FIG. 17 is a bar graph showing percent crystallinity for HDPE untreated samples and samples which have been treated with 890 MPa pressure and different temperatures (60, 80, 100, and 127° C.).

Figure 18:
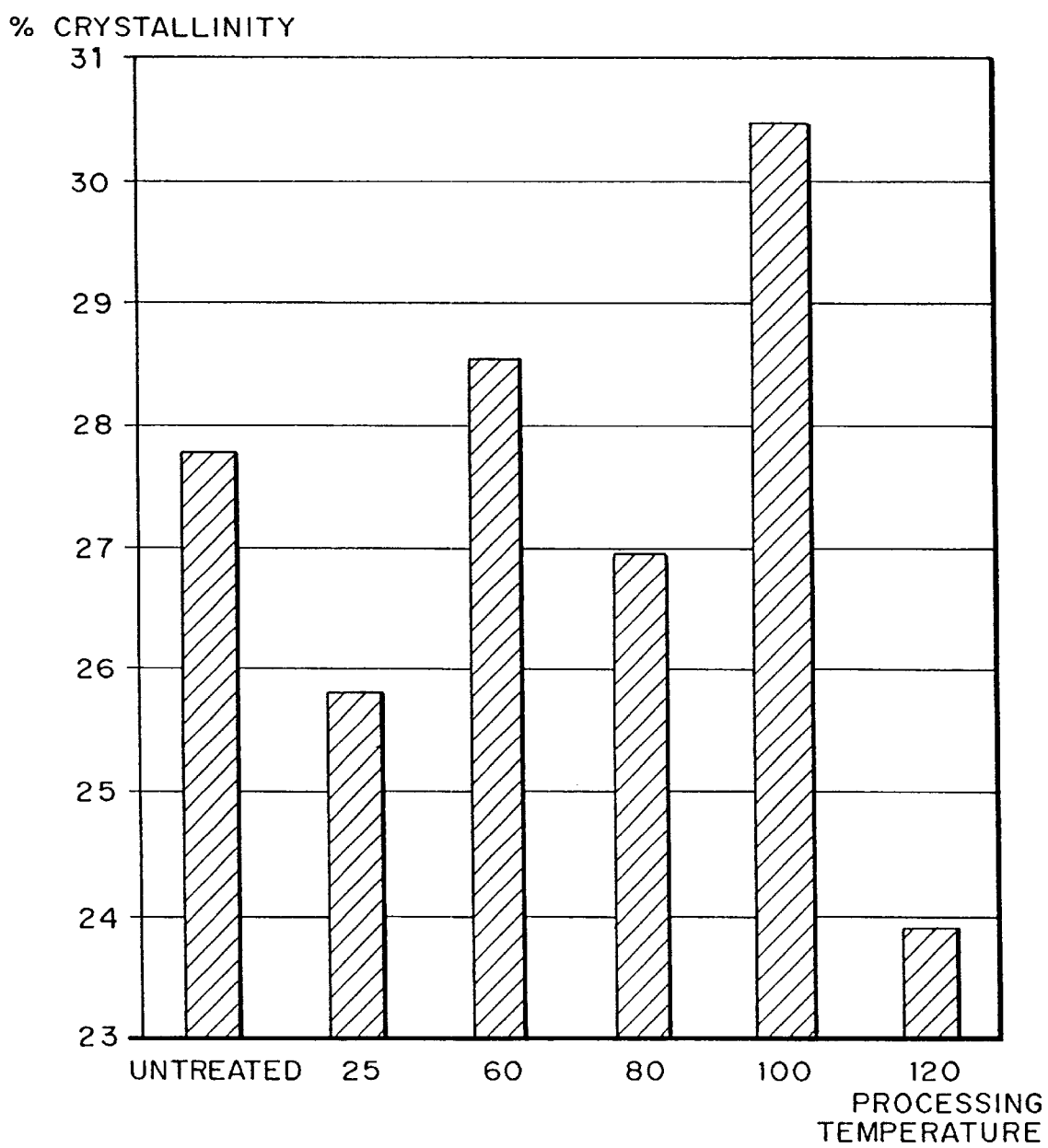

FIG. 18 is a bar graph showing percent crystallinity for polystyrene untreated samples and samples which have been treated with pressure and different temperatures (25, 60, 80, 100, and 120° C.).

Figure 19A:
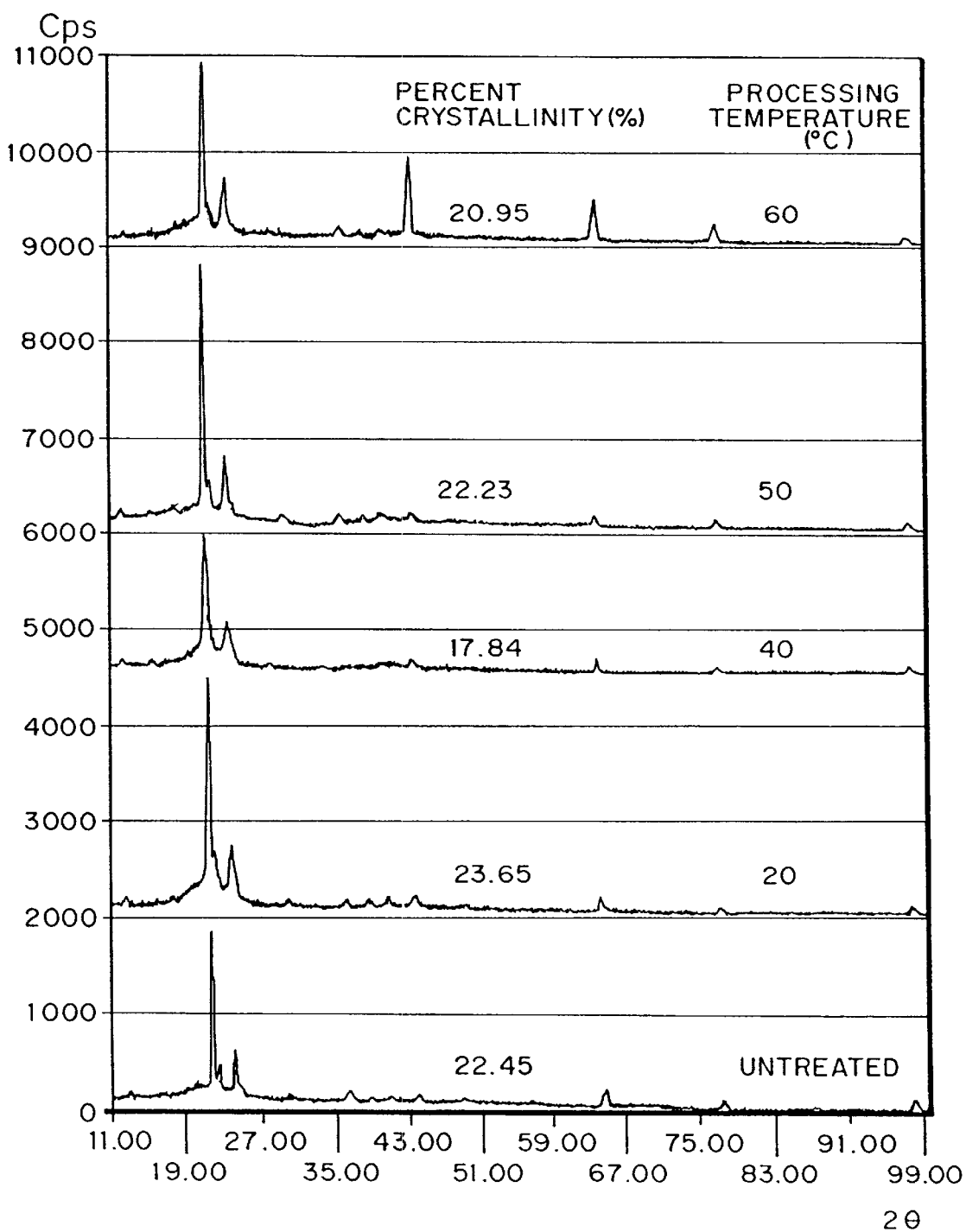
Figure 19B:
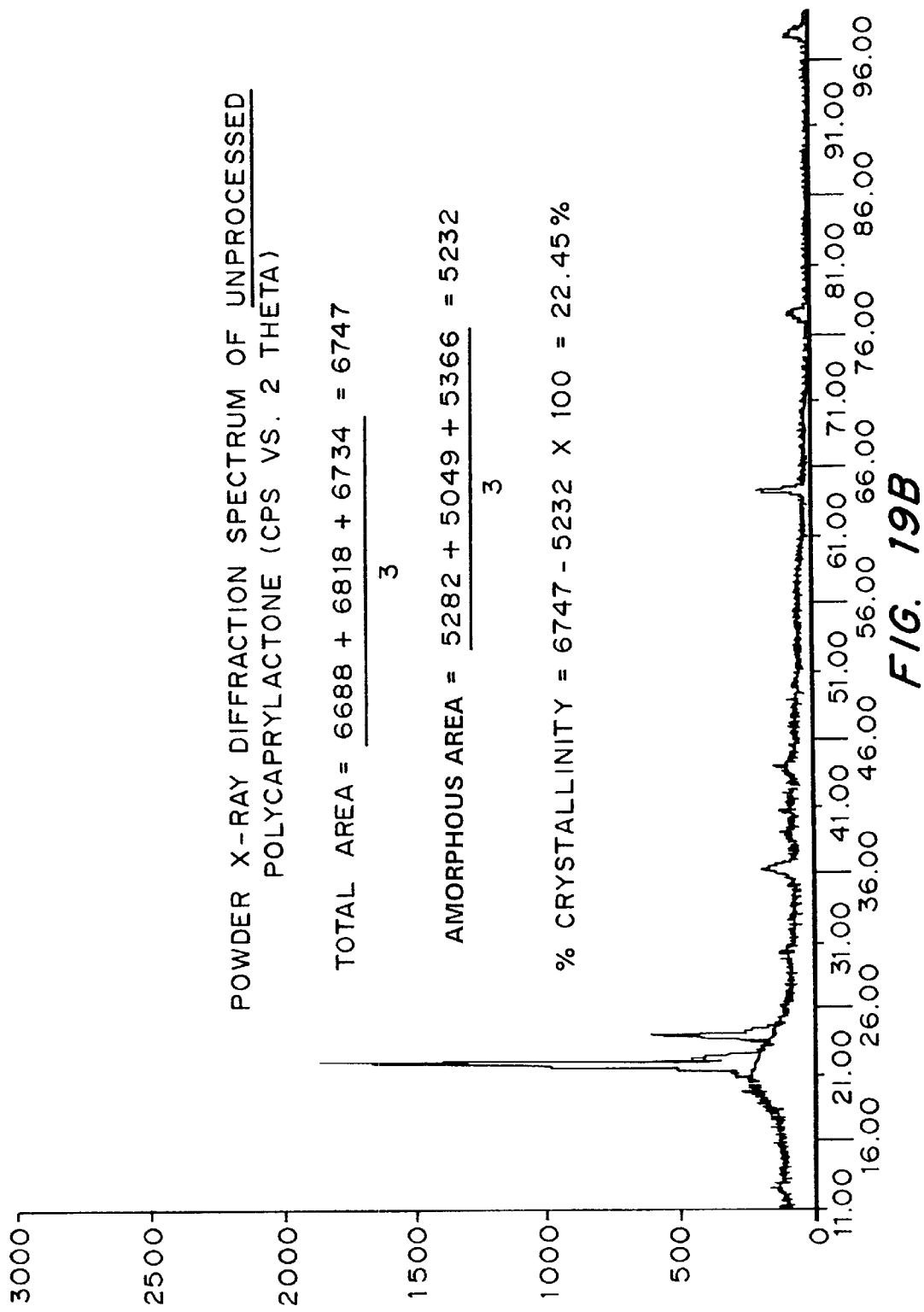

FIGS. 19A–19B are graphs showing X-ray powder diffraction of PCL films, untreated and treated with pressure and different temperatures.

DETAILED DESCRIPTION OF THE INVENTION

It has been discovered that liquid crystals can be induced in virtually any polymer, even those without mesogenic structures which had been thought to be necessary for the exhibition of liquid crystalline properties. The method of inducing the liquid crystals includes the application of high pressure to the polymer, while heating it above or near the glass transition temperature yet below the melting point of the polymer. Unlike many prior art transition processes which are reversible, this process induces a liquid crystal state that can be maintained for years at ambient conditions.

1. Definitions

As used herein, the term "molecular weight" refers to weight average molecular weight when that term is used to refer to the molecular weight of polymers, and can be abbreviated by the symbol "MW" or "Mw." The symbols "Da" and "kDa" refer to "Daltons" and "kiloDaltons," respectively, both standard units of measure for weight average molecular weight.

As used herein, the terms "liquid crystal" and "liquid crystalline" are used as those terms are known in the art, discussed in more detail below, and further include the phase induced in non-mesogenic polymers which differs from the crystalline phase of the polymers based on comparison of changes in optical properties, x-ray diffraction, density, or thermal analysis results.

The term "non-mesogenic polymer" is used herein to refer to polymers without discotics and/or rigid, rod-shaped molecules, which structures are known in the art to promote two-dimensional columnar ordering and/or preferential alignment along one spatial direction.

As used herein, the term "ambient" is used to refer to normal, approximately average, environmental temperatures and pressures, typically about 25° C. and about 760 mm Hg.

As used herein, the term "bioerodible" is used to refer to polymeric materials that will erode or degrade over time (usually in vivo), preferably less than about one year due, at least in part, to contact with a aqueous solution of pH 6–8 at a temperature of between about 25 and 38° C. and/or cellular action, especially enzymatic cleavage. The term may include polymer that erodes in vitro when exposed to water and/or enzyme. The term does not include polymers that erode over two or more years due to hydrolytic degradation.

As used herein, the term "water soluble polymer" refers to polymers that have at least 1% solubility (w/w) at 25° C. and 760 mm Hg.

2. Liquid Crystals

Liquid crystals are materials that exhibit long-range order in only one or two dimensions, not all three. A distinguishing characteristic of the liquid crystalline state is the tendency of the molecules, or mesogens, to point along a common axis, known as the director. This feature is in contrast to materials where the molecules are in the liquid or amorphous phase, which have no intrinsic order, and molecules in the solid state, which are highly ordered and have little translational freedom. The characteristic orientational order of the liquid crystal state falls between the crystalline and liquid phases.

Liquid crystalline ("LC") structures typically are categorized as nematic, smectic, or cholesteric. The nematic phase is characterized by molecules that have no positional order, but tend to point along the director. The smectic phase is a mesophase in which molecules show a degree of translational order not present in the nematic phase. In the smectic phase, the molecules maintain the general orientational order of the nematic phase, and also align themselves in layers or planes. Motion is restricted to within these planes; however, separate planes can flow past one another. Several smectic mesophases are known, such as smectic A and smectic H. The cholesteric, or chiral nematic, phase typically is composed of nematic mesogenic molecules containing a chiral center, which produces intermolecular forces that cause alignment between molecules at a slight angle to one another. The resulting structure can be visualized as consisting of multiple, thin nematic-like layers stacked such that the director in each layer is twisted or offset with respect to those above and below so as to form a helical pattern.

Liquid crystals also can be classified as thermotropic or lyotropic. These types are distinguishable by the mechanisms, or transitions, facilitating their organization structure. Thermotropic transitions, which occur in most liquid crystals, are induced thermally by raising the temperature of a solid and/or lowering the temperature of a liquid. Thermotropic liquid crystals can be further classified as enantiotropic or monotropic. Enantiotropic liquid crystals can be changed into the LC state both by lowering the temperature of a liquid and raising of the temperature of a solid, while monotropic liquid crystals can only be changed into the LC state from either an increase in the temperature of a solid or a decrease in the temperature of a liquid, but not both. In contrast to thermotropic mesophases, lyotropic transitions occur under the influence of solvents, not a change in temperature. The solvent induces aggregation of the constituent mesogens into micellar structures, since lyotropic mesogens typically are amphophilic.

Numerous chemical compounds are known to exhibit one or more liquid crystalline phases. The molecules of these compounds typically include discotics and/or rod-shaped molecules. Discotics are flat, plate-like molecules consisting of a core of adjacent aromatic rings, which facilitate two-dimensional columnar ordering. Rod-shaped molecules, in contrast, have an elongated rigid anisotropic geometry, which promotes preferential alignment along one spatial direction. For example, the interconnection of two rigid cyclic units results in a compound having a linear planar conformation. Linking units containing multiple bonds, such as —(CH=N)—, —N=N—, —(CH=CH)$_n$—, and —CH=N—N=CH—, also restrict the freedom of rotation. These groups can conjugate with phenylene rings, enhancing the anisotropic polarizability and increasing the molecular length, while maintaining the rigidity of the structure.

3. Identification of Liquid Crystals

At least two independent methods are used to verify that a particular material includes a liquid crystal phase. The presence of LCs in the polymers described herein can be measured using essentially any technique known in the art. The methods can be used to identify the ordered structures in materials considered liquid crystalline or materials that include an ordered phase that is not generally considered liquid crystalline. Useful methods include optical pattern or texture observations with a polarizing microscope, differential scanning calorimetry, miscibility or density comparisons, molecular orientations by either supporting surface treatments or external fields, and classical x-ray and x-ray diffraction techniques, which are described in Noel, "*Identification of Mesophases Exhibited by Thermotropic Liquid Crystalline Polymers*" in Polymer Liquid Crystals (Blumstein, ed.) pp.21–59 (Plenum Press, New York 1983).

4. Polymers

The methods described herein can induce a LC state in a wide variety of polymers, including non-mesogenic polymers. The polymers useful in the methods described herein are referred to as "LC polymers," which include both mesogenic (known in the prior art to exhibit LC properties) and non-mesogenic (according to the prior art, incapable of exhibiting LC properties). The selection of the polymer in which it is desirable to induce liquid crystals depends on a variety of factors, including physical and chemical properties of the polymer, processing requirements, physical and chemical specifications of the end product, and cost of the polymer. Bioerodeability and water solubility are two such factors.

Mesogenic Polymers

Examples of mesogenic liquid crystalline polymers which can be used in the methods described herein include poly (β-thioester) [from 1,6-hexane-bisthiol and 3-methyl-1,6-hexamethylene-p-phenylate p-phenylate diacrylate], poly(1,2-dimethyl ethylene-p-terphenylate), poly(tetraoxyethylene-p-terphenylate), poly(ethylene-p-terphenylate), poly(4'-cyanobiphenyl-4-oxyhexylacrylate), 2-hydroxypropyl cellulose, poly(bis trifluoroethoxyphosphazene), poly(p-phenylene benzobisthiazole), polybenzamide, polystyrene/polyisoprene block copolymers, polystyrene/polyethylene oxide block copolymers, polyanhydrides poly(hydroxybenzoate/hydroxynaphthalate), poly(y-benzyl-L-glutamate), poly(phenylene terephthalamide), poly(bromo-p-phenylene-1,10-diphenyl decanate), and poly(γ-benzyl-L-glutamate)s. The repeat unit structure and type of LC structure for each of these polymers is provided, for example, in Woodward, *Atlas of Polymer Morphology*, pp. 223–25 (Hanser Publishers, New York).

Non-Mesogenic Polymers

Examples of non-mesogenic liquid crystalline polymers which can be used in the methods described herein include amyloses; derivatized celluloses such as alkyl cellulose, hydroxyalkyl celluloses, cellulose ethers, cellulose esters, nitro celluloses, methyl cellulose, ethyl cellulose, hydroxypropyl cellulose, hydroxy-propyl methyl cellulose, hydroxybutyl methyl cellulose, cellulose acetate, cellulose propionate, cellulose acetate butyrate, cellulose acetate phthalate, carboxylethyl cellulose, cellulose triacetate, and cellulose sulphate sodium salt (collectively referred to herein as "celluloses"); ladder polymers; phenol-formaldehydes; polyacetals; polyacetylene; polyacrylamides; poly(acrylic acid)s; polyacrylonitriles; poly(L-analine)s; polyamides; polyanalines; polybenzimideazoles; polybenzobisoxazoles; polybenzobisthiazoles; 1,2-polybutadienes; cis-1,4-polybutadiene; trans-1,4-polybutadiene; poly(butene-1); polybutylene-terephthalate; polycarbonate; cis, trans-1-4-polychloroprene; polychlorotrifluoroethylene; polydiethylsiloxane; polydimethylsiloxane; polydiphenylsiloxane; some polyesters; polyetheretherketone; polyethylene and derivatives thereof, such as poly(ethylene imine), poly(ethylene oxide), poly(ethylene glycol), and polyethylene-terephthalate; polyglycine; poly(hexamethylene adipamide); polyimide; poly(imino-1,3-phenylene iminoisophthaloyl) (NOMEX™); poly(imino-1,4-phenylene iminoterephthaloyl) (KEVLAR™); polyisobutylene; polyisocyanate; polyisocyanide; cis-1,4-polyisoprene; trans-1,4-polyisoprene; polylactam; polylactone; polystyrenes including poly(p-methyl styrene); poly(methyl acrylate) and derivatives thereof, such as poly(methyl methacrylate); poly(α-methyl styrene); poly(methylene oxide); polymethylphenyl-siloxane; polynitrile; polynucleotide; poly(n-pentene-2); poly(n-pentene-1); polypeptides such as poly(α-amino acid); poly(p-phenylene oxide); poly(p-phenylene sulfide); poly(p-phenylene vinylene); poly(p-phenylene); some polyphosphates; some polyphosphazenes; polyphosphonate; polyalkylenes such as polypropylene; polyakylene oxide; poly(pyromellitimide-1,4-diphenyl ether) (KAPTON™); polypyrrole; polysilane; polysilazane; polysiloxane; polysulfide; polysulfur; polytetrafluoroethylene (TEFLON™); poly(tetramethylene oxide); polythiophene; polyurea; polyurethane; poly(L-valine); poly(vinyl acetate); poly(vinyl alcohol); poly(vinyl chloride); poly(vinyl fluoride); poly(2-vinyl pyridine); poly(N-vinyl pyrrolidone); poly(vinylidene chloride); poly(vinylidene fluoride); and vinyl polymer. The structure of the repeat unit for each of these polymers is provided, for example, in *Physical Properties of Polymers Handbook* (J. Mark, ed.), ch. 2, pp. 29–36 (AIP Press, Woodbury, N.Y. 1996).

Bioerodible LC Polymers

Representative bioerodible LC polymers include polyanhydrides and some polyesters. Representative polyanhydrides include poly(fumaric acid-co-sebacic acid), poly(carboxyphenoxypropane-co-sebacic acid), and poly(maleic acid). Preferred LC polymers include polyethylene, polystyrene, polycaprolactone, poly(lactic acid), and polylactide-co-glycolide.

Suitable bioerodible LC polymers include both mesogenic and non-mesogenic polymers. Representative non-mesogenic, bioerodible polymers include polylactic acid, polylactide-co-glycolide, polycaprolactones, polyvaleric acid, polyorthoesters, polyhydroxybutyrate, polysaccharides such as amylose and cellulose, polypeptides (e.g., poly-L-alanine, poly-γ-benzyl-L-glutamate, polyglycine, and poly-L-valine), poly(ϵ-caprolactam), poly(ϵ-caprolactone), and certain polyesters. Representative mesogenic, bioerodible polymers include polyanhydrides, polybutylene terephthalate, and polycarbonate.

Non-Bioerodible LC Polymers

Suitable non-bioerodible LC polymers also include both mesogenic and non-mesogenic polymers. Preferred LC polymers include polyesters, polypropylene, polystyrene, and polyterephthalic acid.

5. Process for Inducing the LC State in Polymers

The process for inducing a liquid crystal state in a polymer includes the following steps: (a) heating the polymer from an initial temperature below its glass transition temperature (Tg) to a temperature greater than its Tg and below its melting temperature (Tm); (b) subjecting the polymer to a pressure greater than about 28 MPa (2 metric tons/in$^2$), preferably between about 28 and 140 MPa (2 and 10 metric tons/in$^2$), preferably for at least about one minute, while maintaining the temperature greater than its Tg; and (c) cooling the polymer below the Tg while maintaining the elevated pressure. Preferably, the polymer is heated and cooled at a rate between about 1 and 30° C./min. The pressure is not required to be maintained for long periods of time at the elevated temperature prior to quenching the polymer, in order to induce the liquid crystalline phase in the polymer. Durations of between about 1 and 10 minutes are preferred.

The method of inducing an LC state is believed to occur by the polymer chains become more fluid at temperatures between Tg and Tm, and are thus more susceptible to alignment under pressure. Above Tm, however, the polymer chains are completely in the liquid phase.

6. Applications for the LC Polymers

The LC polymer can be made in a variety of forms including films, film laminants, coatings, membranes, microparticles, slabs, extruded forms, and molded forms. Several types of delivery devices, such as thin films, pellets, cylinders, discs, and microparticles can be prepared from the LC polymers, using methods well known to those of skill in the art. As used herein, microparticles are particles having a diameter of less than about one millimeter that include an incorporated agent. The microparticles can have a spherical, non-spherical, or irregular shape. Preferably, the microparticles are spherical. The LC polymers can be combined with each other, with non-LC polymers, or with other materials such as metals, ceramics, glasses, or semiconductors, the latter typically in the form of coatings. The polymers can be fabricated into articles and then treated to induce the LC state, or the LC state can be induced and then articles formed from the LC polymer.

The advantage of LC polymer films over other polymer films is that the films generally are more dense, thus providing greater mechanical strength and delayed diffusion through the film. These advantages are particularly useful in packaging applications.

Compositions that include the LC polymers can be monolithic or layered. The term "monolithic" is used herein to describe a continuous phase having imbedded structures, rather than layers. The LC polymers can be prepared separately and then mixed with other materials in a process that does not change the transition temperature.

The applications for these polymers are numerous. Bioerodible LC polymers, for example, can be used in delivery systems for therapeutic, diagnostic, and prophylactic agents, particularly as implantable devices. Non-erodible LC polymers, for example, can be used in display systems, such as for computers, and in message systems wherein a message can be displayed or hidden from view based on changes in the opacity/transparence of the LC polymer which occur with changes in the crystal structure of the material. LC polymers also can be used in product packaging. For example, LC polymers can be adapted to form membranes or films that are less permeable to gases, such as oxygen, as compared to non-LC polymer films. The LC polymers also may be adapted for use as a shape memory material, capitalizing on the state change of the polymers to provide a particular effect.

The methods of inducing liquid crystalline properties in polymer also can be used to improve the permeability of polymers in numerous applications, such as packaging, particularly food and pharmaceutical packaging. The methods similarly can be used to enhance the structural performance of polymeric prosthetic devices, such artificial knees made of polyethylenes.

The unique physical properties of the LC polymers described herein can be highly useful in the release of substances encapsulated in the LC polymers. Representative substances for encapsulation include scents such as perfumes or pheromones, flavoring agents (e.g., edible oils), dyes or other coloring agents, nutrients (e.g., minerals such as calcium, zinc, vitamins A, E, C, and D, and the B vitamins), sunscreen, and pesticides. Encapsulation of substances in LC polymers generally requires that the substance be mixed into the polymer prior to the induction of the LC state. This mixing typically is done by adding the substance to the polymer while in solution or while above the Tm of the polymer before treating the polymer as described herein to induce an LC state.

In a preferred embodiment, the LC polymers are used to encapsulate therapeutic, diagnostic, or prophylactic agents (referred to collectively herein as "active agents"), for various medical and pharmaceutical applications. Examples of suitable therapeutic and/or prophylactic agents include proteins, such as hormones, antigens, and growth factors; nucleic acids, such as antisense molecules; and small molecules, such as antibiotics, steroids, decongestants, neuroactive agents, vasoactive agents, analgesics, anesthetics, and sedatives. Examples of suitable diagnostic agents include radioactive isotopes and radiopaque agents. The polymeric matrices can include more than one incorporated agent. A therapeutically, prophylactically, or diagnostically effective amount of the agents are incorporated into the LC polymer matrices. An effective amount of these agents can be readily determined by a person of ordinary skill in the art taking into consideration factors such as body weight; age; physical condition; therapeutic, prophylactic, or diagnostic goal desired; type of agent used; type of polymer used; initial burst and subsequent release levels desired; and desired release rate. Typically, the polymeric matrices will include between about 0.01% (w/w) and 80% (w/w) of incorporated agent.

The incorporated agent may be in the form of particles, for example, crystalline particles, non-crystalline particles, freeze dried particles, or lyophilized particles. LC polymer particles preferably are less than about 20 μm in size, and more preferably less than about 5 μm, for parenteral or pulmonary administration to a patient, but may be substantially larger for internal or subcutaneous administration. The particles also may include a stabilizing agent and/or other excipient.

Another application for the polymers is as a barrier material, for example, in packaging. That is, the polymer, typically in the form of a film coating on a packaging article, can serve as a barrier to prevent or delay fluids, such as water, oxygen, or carbon dioxide, from diffusing into or out of a closed packaging container, such as those containers used for food or drugs. The polymer can be formed and applied by adapting the methods disclosed herein to known techniques for making and coating packaging articles.

Other applications for the LC polymers include the production of high-strength materials and optical devices. The LC polymers can be used in the production of high strength fibers and products requiring strong, lightweight materials of construction. The LC polymers can also be used in liquid crystal displays, capitalizing on the unique optical properties of LC materials. The utilization of LC polymers in optically nonlinear devices, including optical waveguides and electro-optic modulators, as well as in optical recording and imaging, is also envisioned.

Another application for the LC polymers is in temperature sensing devices, for example. In one medical application, the sensor is attached to the skin to provide a temperature map indicating local temperature variations. Such devices are useful, for example, in the diagnosis of certain medical ailments, such as tumors, or areas of infection or inflammation or poor circulation which have a temperature different from the surrounding healthy tissue.

High density polyethylene (HDPE) has enormous application in prosthetics, for example, hip bone replacement. However, HDPE in load bearing applications exhibits wear debris over time. It has been hypothesized that reducing crystallinity (spherulites structures) can reduce this wear debris. Therefore, the use of a liquid crystal form of HDPE is one means of reducing HDPE crystallinity while retaining a high degree of order in the "crystalline" polymer. The same techniques are applicable to a variety of other crystalline polymers.

The compositions and methods of preparation and use thereof described herein are further described by the following non-limiting examples.

EXAMPLE 1

Study of Induction and Retention of LC State in Polymers

A series of studies were conducted on a several polymers, which are listed below in Table 1. A 0.5 g sample of each polymer was heated above the glass transition temperature (Tg), usually 5 to 10° C. for the amorphous materials and 10 to 20° C. for the crystalline polymers. Crystalline materials, such as PCL, were heated up to 2 to 5° C. below the melting point. The polymer sample was then placed on rectangular plates and pressed at a pressure ranging from 28 and 140 MPa (2 to 10 metric tons/in$^2$) using a brass pin dye with a Wabash Press. The sample was allowed to cool under pressure from 0.5 to 10 minutes. All samples exhibited typical Schlieren, or liquid crystalline, structure under polarizing optical microscopy. Rotation of the polarizer's analyzer indicated that the structure is retained at all angles. Most samples that were left at room temperature retained the liquid crystalline structure for at least 3 years as determined by optical microscopy.

EXAMPLE 2

Release of Insulin from Polycaprolactone: Melt, Liquid Crystal, and Solvent Cast Slabs Polycaprolactone (PCL) (MW=110 kDa) containing insulin was formed into cylindrical slabs, each of approximately the same dimensions, using one of the following techniques: (1) solvent casting of a 10% (w/v) solution, (2) melt casting in a custom mold at 80° C., and (3) heat compression at 60° C. (hot melt) with application of 890 MPa (10,000 metric tons/cm$^2$) using a brass pin dye with a Wabash Press. The hot melt process provided the liquid crystal formulation.

First, the starting material was prepared from 24.63 mg of insulin suspended in 2.0 g of PCL in methylene chloride and thoroughly mixed in a Virtis rotor-stator in 100 ml methylene chloride. The loading was 12.3 µg of micronized insulin/mg polymer, or 1.23% (w/w). The dispersed drug-polymer mix was cast into a film, allowed to dry, cut into pieces, and ground to make a uniform starting material. Before grinding, an aliquot of the film material was used for solvent casting of films. The ground starting material was melted at 80° C. in a mold to make melt cast samples. For the heat-compressed series, the ground starting material was compressed under a pressure of 890 MPa (10 metric tons/cm$^2$) at 60° C., and had liquid crystalline morphology when observed with crossed polarizers in a light microscope. A physical description of the samples is provided in Table 2 below.

TABLE 2

Polymer Sample Specifications

| Slab Type | Sample No. | Slab Diameter (cm) | Slab Thickness (mm) | Slab Weight (mg) |
|---|---|---|---|---|
| Heat Compr. | 1 | 9.14 | 500 | 43.3 |
| Heat Compr. | 2 | 9.0 | 148 | 10.2 |
| Heat Compr. | 3 | 9.0 | 296 | 29.0 |
| Heat Compr. | 4 | 9.0 | 385 | 28.9 |
| Heat Compr. | 5 | 9.0 | 1212 | 66.5 |
| Melt Cast | 1 | 7.7 | 1643 | 63.1 |
| Melt Cast | 2 | 7.7 | 1801 | 63.0 |
| Melt Cast | 3 | 7.7 | 1626 | 60.5 |
| Melt Cast | 4 | 7.7 | 1761 | 58.8 |
| Melt Cast | 5 | 7.7 | 1606 | 61.6 |
| Solvent Cast | 1 | 10.3 | 155 | 8.7 |

TABLE 1

Induction and Retention of LC State in Various Polymers

| Polymer Type | Amorphous or Semi-crystalline? | Molecular Weight (MW) | LC State Observed By Polarized Light | Tg (° C.) | Tm (° C.) | Duration of LC State (yrs.) |
|---|---|---|---|---|---|---|
| Polycaprolactone | C | 110 K | Yes | — | 60 | 2 |
| Polycaprolactone | C | 32 K | Yes | — | — | 2 |
| Polystyrene | A | 2.3 K | Yes | ~120 | — | 2 |
| Polystyrene | A | 45 K | Yes | ~120 | — | 2 |
| Polystyrene | A | 120 K | Yes | ~120 | — | 2 |
| Polylactide-co-glycolide 50:50 | A | — | Yes | 30–40 | — | 3 |
| Polylactide-co-glycolide 25:75 | A | — | Yes | 30–40 | — | 3 |
| Polylactide | C | 2 K | Yes | 45 | 120 | 3 |
| Polytetrafluoro-ethylene | C | — | Yes | — | — | 2 |

TABLE 2-continued

Polymer Sample Specifications

| Slab Type | Sample No. | Slab Diameter (cm) | Slab Thickness (mm) | Slab Weight (mg) |
|---|---|---|---|---|
| Solvent Cast | 2 | 10.3 | 242 | 12.4 |
| Solvent Cast | 3 | 10.3 | 278 | 20.1 |
| Solvent Cast | 4 | 10.3 | 324 | 14.1 |
| Solvent Cast | 5 | 10.3 | 263 | 18.1 |

Aliquots of films were incubated in 1 ml of physiological saline at pH 7.4 at 37° C. The release fluids periodically were collected and replaced with fresh saline. Insulin release was determined with BCA Protein Assay.

Figure 1:
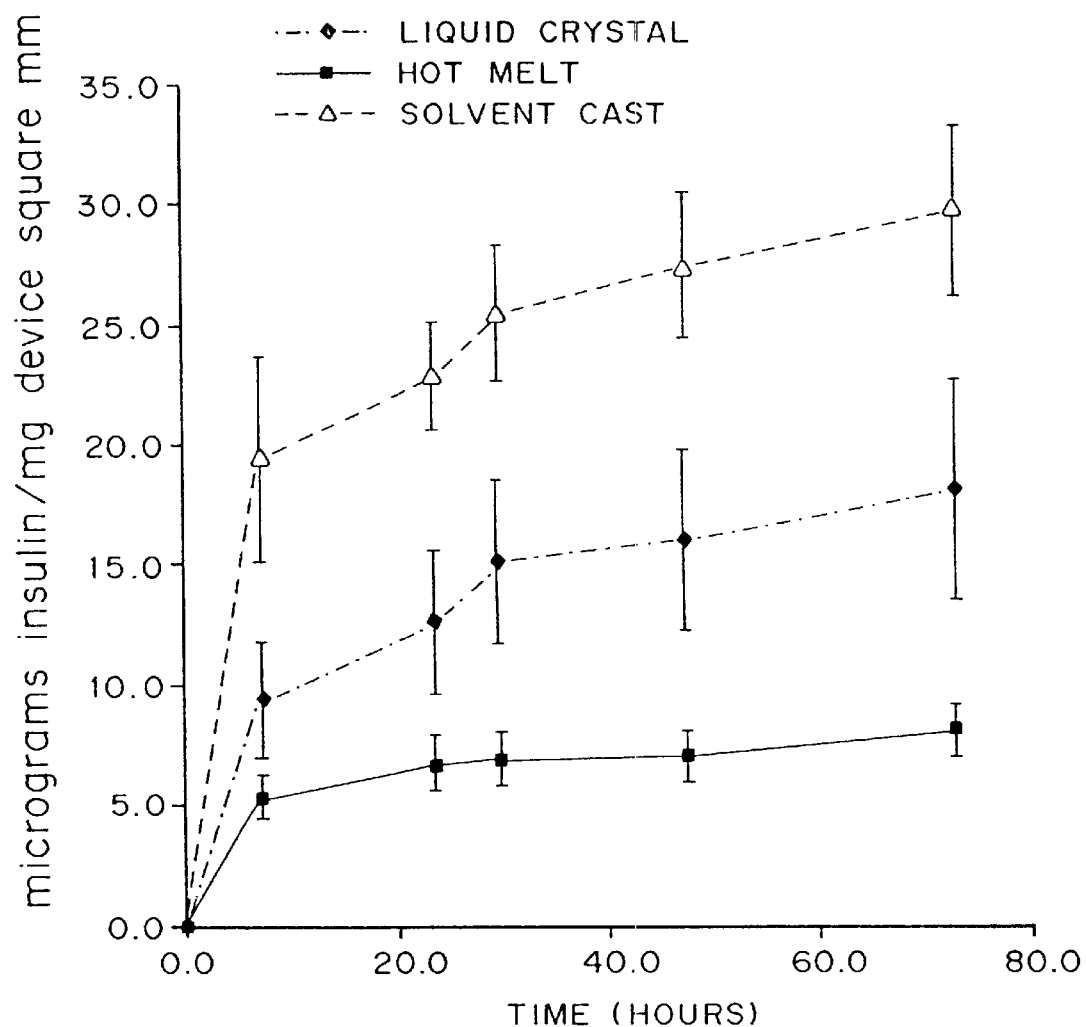
FIG. 1 is a graph showing release rate (hours) of insulin fabricated in polycaprolactone polymeric slabs prepared in three different formulations: solvent cast (triangle), melt cast (square), and liquid crystalline state (diamond).

Release kinetics observed for the different samples are shown in FIG. 1. One can see that the insulin is released by diffusion, since the polymer had no time to degrade during the 80 hr. time period observed. Additionally, due to the low concentration of the insulin, it is clear that different formulations exhibit different release rates based on the nature of the polymer fabrication. Liquid crystalline material released the drug at a rate that is between the rate of release of the solvent cast (the fastest) and the melt cast (the slowest) release curves.

The release must be dependent on polymer microstructure, since the insulin loading was low, which reduces the opportunity for formation of interconnected pores or channels, which would facilitate release of insulin or any other loaded agent. In contrast, when loading is high, e.g. above about 30%, some of the drug can diffuse out of the polymer through channels created as drug particles in close proximity to one another diffuse out, leaving pores that are interconnected and creating a path for further diffusion. This conclusion is further supported by the fact that the polymer does not degrade within the time scale of the study (80 hrs). Therefore, the liquid crystal formulation necessarily has different physical properties than the solvent or melt cast formulations.

EXAMPLE 3

Density of Liquid Crystal Samples Compared to Untreated Polymer

The densities of the polymers that were induced to enter the liquid crystal state in Example 1 were compared with the densities of the native (untreated) polymers, using flotation in either sucrose or sodium bromide step gradients. Density gradients were prepared by overlaying 2 ml steps of concentrated sucrose solutions ranging from 12 to 60% (w/v), or concentrated sodium bromide solutions ranging from 10 to 60% (w/v), in 15 ml centrifuge tubes. All solutions contained 0.1% (w/v) PLURONIC F127 (made by BASF) to reduce hydrophobic interactions and facilitate wetting of the polymer surface. Samples were introduced onto the uppermost layer, the tubes were centrifuged at 2,000 rpm for 10 min., and the final position of the sample within the gradient was recorded. For each sample, the liquid crystalline (LC) state was first determined by polarized light. Phases referred to herein as "LC" are phases that reveal typical LC morphology with optical microscopy.

Polystyrene

The native sample of polystyrene (PS) (2.5 kDa) floated at the interface between the 12 and 20% (w/v) sucrose solutions, corresponding to a density of between 1.0465 and 1.0810 g/ml. The liquid crystal sample of PS floated near the top of the 12% sucrose (w/v) layer corresponding to a density of between 1.0 and 1.0465 g/ml. This value demonstrates that a physical change had occurred in the polymer structure which was not due to "densification" of the glass transition. (In many experiments detailed in the prior art, the application of pressure for long periods of time has the effect of increasing the density of polystyrene.) Here, the exact opposite phenomenon was observed: a decrease in polymer density. This corresponds well with additional experiments in which the degree of crystallinity was decreased in samples induced to have an LC state.

Polycaprolactone

The native sample of polycaprolactone (PCL) (32 kDa) floated at the interface between the 40 and 60% (w/v) sucrose solutions, corresponding to a density of between 1.1764 and 1.2865 g/ml. The liquid crystal sample of PCL floated in the middle of the 40% sucrose (w/v) layer, corresponding to a density of 1.1764 g/ml. A lower polymer density was observed in the LC state, similar to the effect seen in the PS study.

Polylactic Acid

Both the native and liquid crystal samples of polylactic acid (PLA) (2 kDa) floated in the middle of the 40% (w/v) sodium bromide layer, corresponding to a density of 1.410 g/ml.

Polylactide-co-glycolide

The native sample of polylactide-co-glycolide (PLG) (50:50 RG503H) floated on top of the 20% (w/v) sodium bromide layer corresponding to a density of less than 1.410 g/ml while the liquid crystal PLG floated at the interface between the 50 and 60% (w/v) sodium bromide. The densities of the 50 and 60% sodium bromide solutions are not given in Table 5 below, but are greater than 1.410 g/ml.

While the changes in density are specific for each polymer, it is clear that the LC phase induced in each case changed the polymer properties. The specific type of LC state induced, however, was not determined. In the case of PLG, which is an amorphous polymer, inducing an LC state increased the density. This contrasts with the other polymers tested in this Example in which the polymers are semicrystalline.

EXAMPLE 4

Thermal Analysis of Liquid Crystalline Polymers and TEFLON™

Figure 2A:
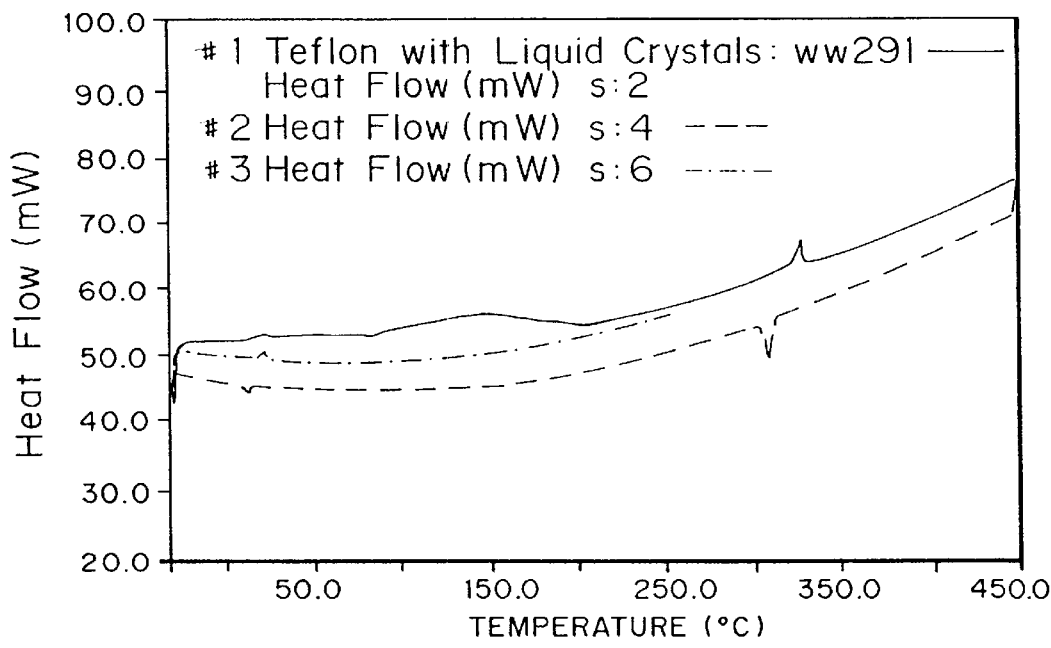
FIGS. 2A and 2B are graphs showing thermal analysis (temperature, ° C. versus heat flow, mW) of a commercial poly(tetrafluoroethylene) film, TEFLON™, before and after heating above the glass transition temperature (20° C.) and pressing for 1 min. using a pressure of 890 MPa (10 metric tons per cm$^2$).
Figure 2B:
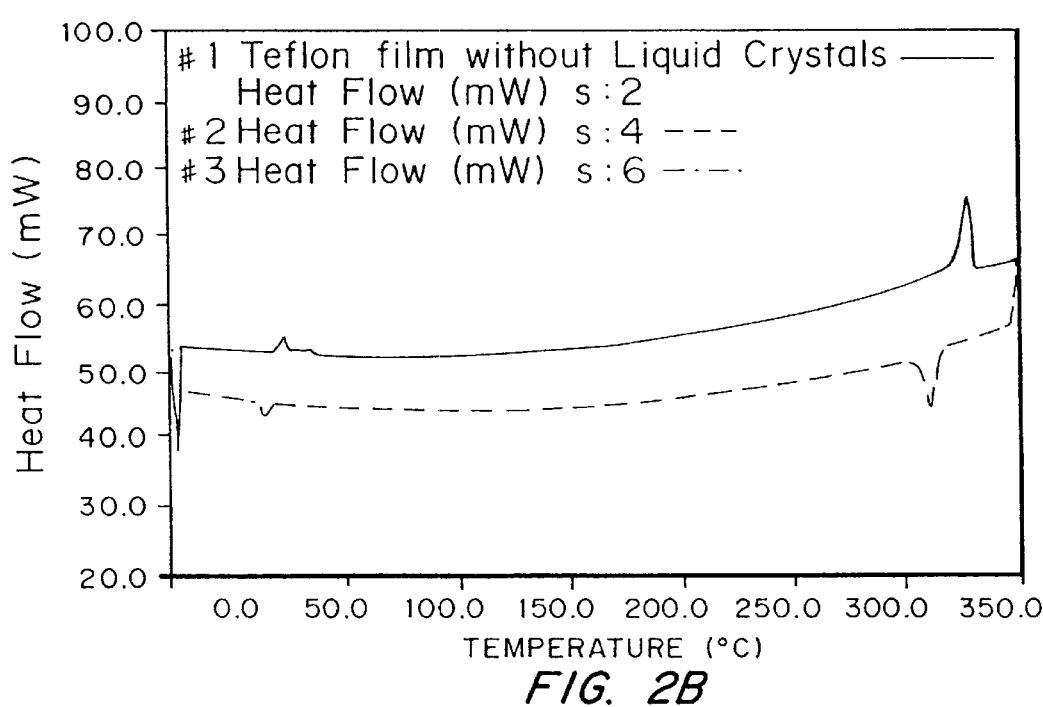

Samples that were pressed with heat as described in Example 1 and found to have LC properties (as determined by polarized light) were studied using Differential Scanning Calorimetry (DSC). The results are shown in FIGS. 2A and 2B. The studies were performed with a Perkin-Elmer Model DSC 7 connected to a controller model TAC 7/DX. Samples were heated from −20 to 250° C. at a rate of 20 or 10° C./min., cooled back to −20° C. at the same rate, and heated again to 250° C. Identification of the LC first order transition was always found on the first run only.

FIG. 2A depicts a thermal analysis of a commercial TEFLON™ film, poly(tetrafluoroethylene), that was heated above the glass transition temperature (above 20° C.) and pressed for 1 min. using a pressure of 890 MPa (10 ton/cm$^2$). The first run of the DSC revealed a glass transition at 2° C., a broad peak between 129 and 150° C., which was attributed to the new phase which was probably in equilibrium with the amorphous phase. Additionally, a well-defined melt at 348°

C. was observed. These results, taken in combination with the polarized light observation, indicate that it is possible to induce LC properties in TEFLON™ and that the phase is stable for long periods of time. FIG. 2B illustrates thermal analysis of amorphous TEFLON™.

EXAMPLE 5

Temperature as a Factor in LC Formation in Polystyrene

A series of polystyrene (PS) (MW=2.5 kDa) samples was prepared, and each sample heated to 23, 50, 70, 83, or 90° C. The samples were pressed for one minute with a pressure of 890 MPa (10 ton/cm$^2$). Optical observation indicated that samples pressed at the glass transition temperature (Tg) (approximately 70° C.) and lower resulted in LC structures with "fan" type morphology, while samples that were pressed at higher temperatures displayed Schlieren structures under optical polarized microscopy. While it is difficult to determine if the final configuration is nematic or smectic, the structures are assumed to be either type.

Figure 3:
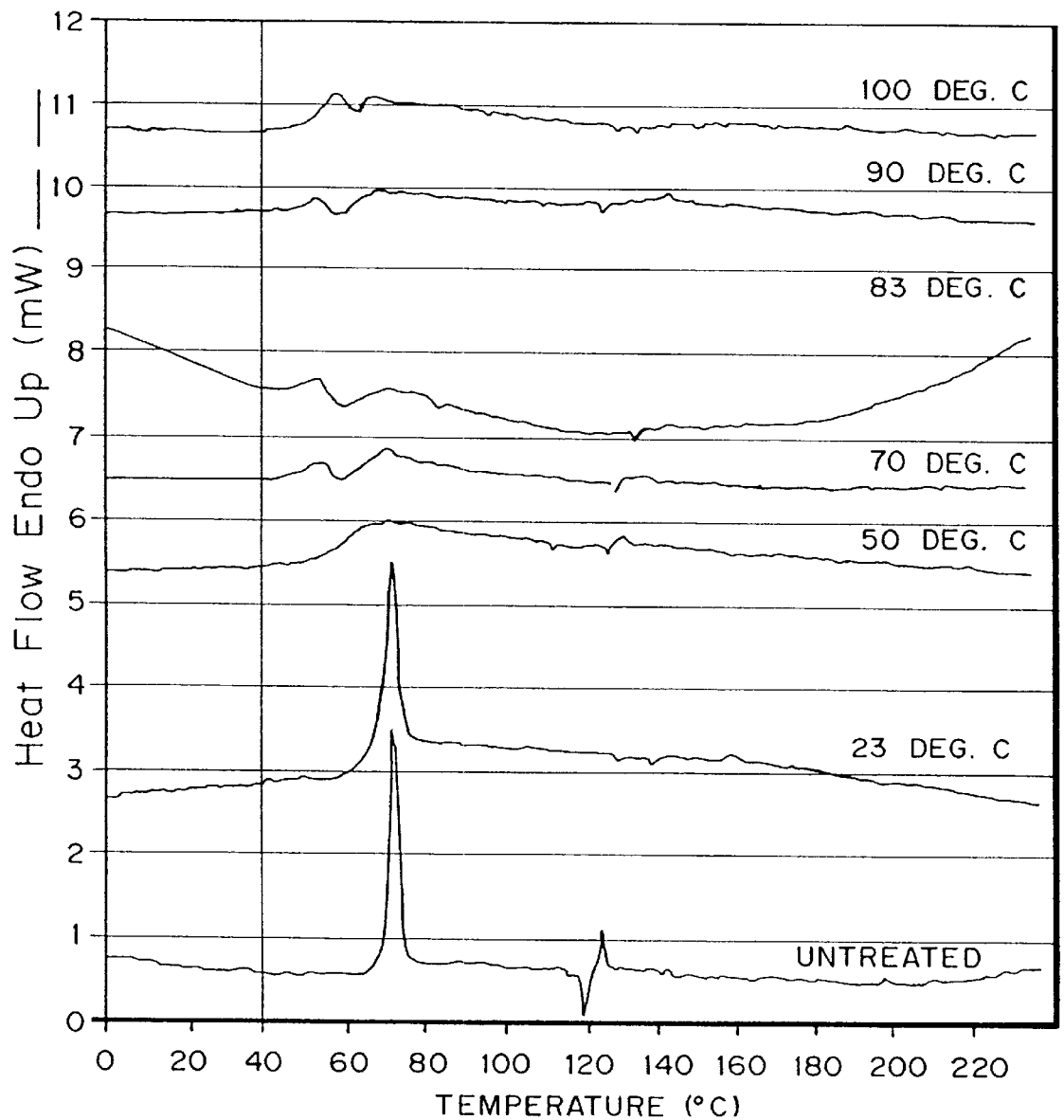
FIG. 3 is a graph showing thermal analysis (temperature, ° C. versus heat flow, mW) of polystyrene films 2.5 kDa that were first heated to the indicated temperatures, 23, 50, 70, 83, 90, and 100° C., and pressed by holding for 3 minutes at –20° C., then heating for –20° C. to 250° C. at 10° C./min. at 890 MPa. There are two new transitions before the glass transition for the samples processed at temperatures of 70, 80, 90, and 120° C.

DSC was conducted as described in Example 4. The DSC results, which are presented in FIG. 3 and Table 3, show a glass transition temperature at 67° C. for the untreated sample. For some treated samples, the Tg is reduced to 48° C., depending on the temperature at which the pressure was applied. Treatment of the polymer above 70° C. reveals a well defined thermal peak, attributable to the induction of the new phase.

TABLE 3

DSC Results for Polystyrene (MW = 2.5 kDa) Films

| Temperature Treated (° C.) | Tg (° C.) | Cp (J/g° C.) | Peak @ (° C.) | H (J/g) |
|---|---|---|---|---|
| untreated | 67.34 | .195 | — | — |
| 23 | 65.73 | .342 | — | — |
| 50 | 60.65 | .289 | — | — |
| 70 | 59.19 | .279 | — | — |
| 83 | 48.07 | .070 | 69.83 | 2.539 |
| 90 | 49.80 | .141 | 69.03 | 4.746 |
| 100 | 54.68 | .315 | 68.200 | 1.713 |

Figure 4A:
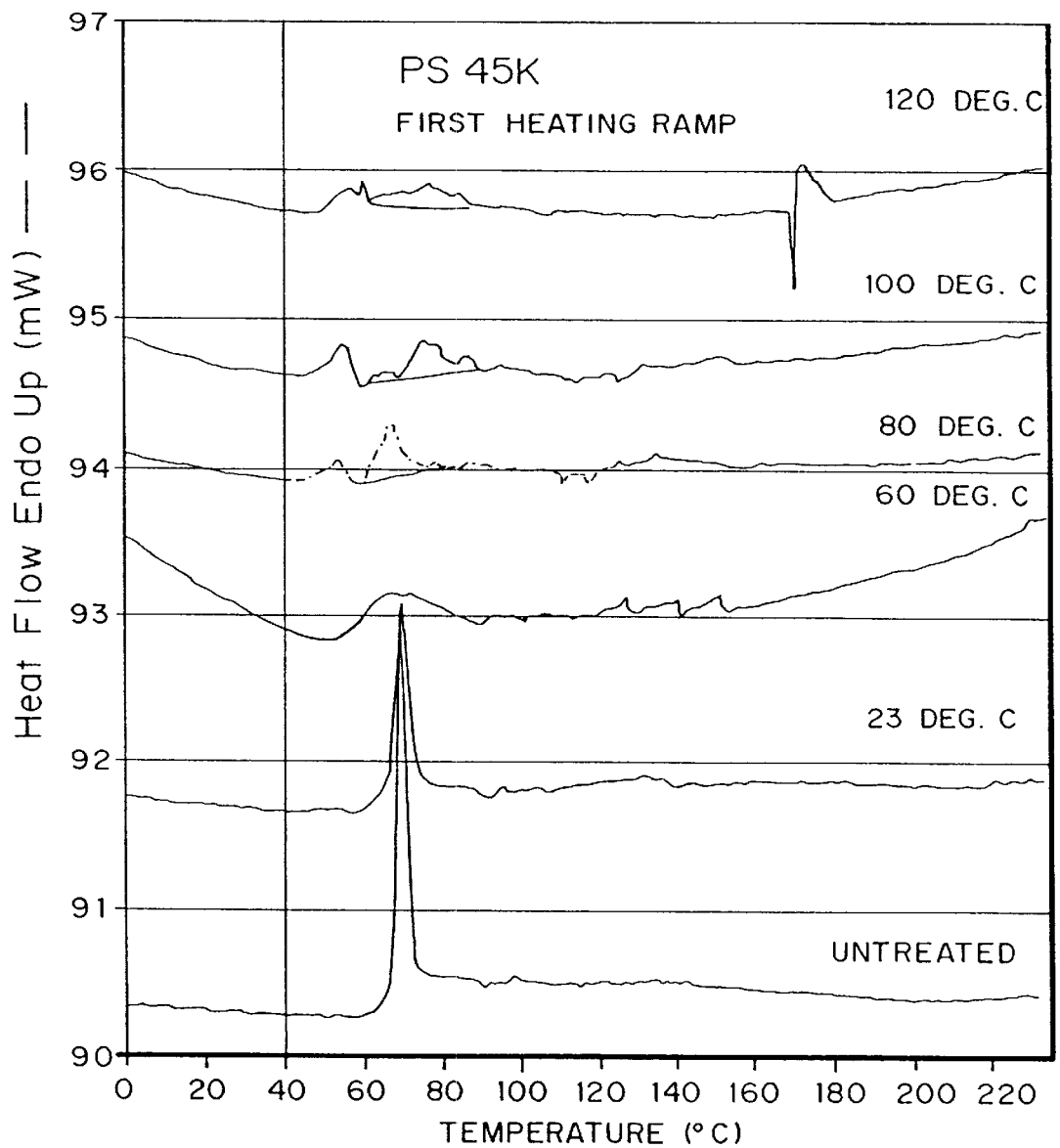
FIGS. 4A–4B are graphs showing thermal analysis of polystyrene films (45 kDa) that were heated to the indicated temperatures, 23, 60, 80, 100, and 120° C., pressed as described in FIG. 3, cooled from 250° C. to 20° C. at 10° C./min, and then heated from –20° C. to 250° C. at 10° C./min.
Figure 4B:
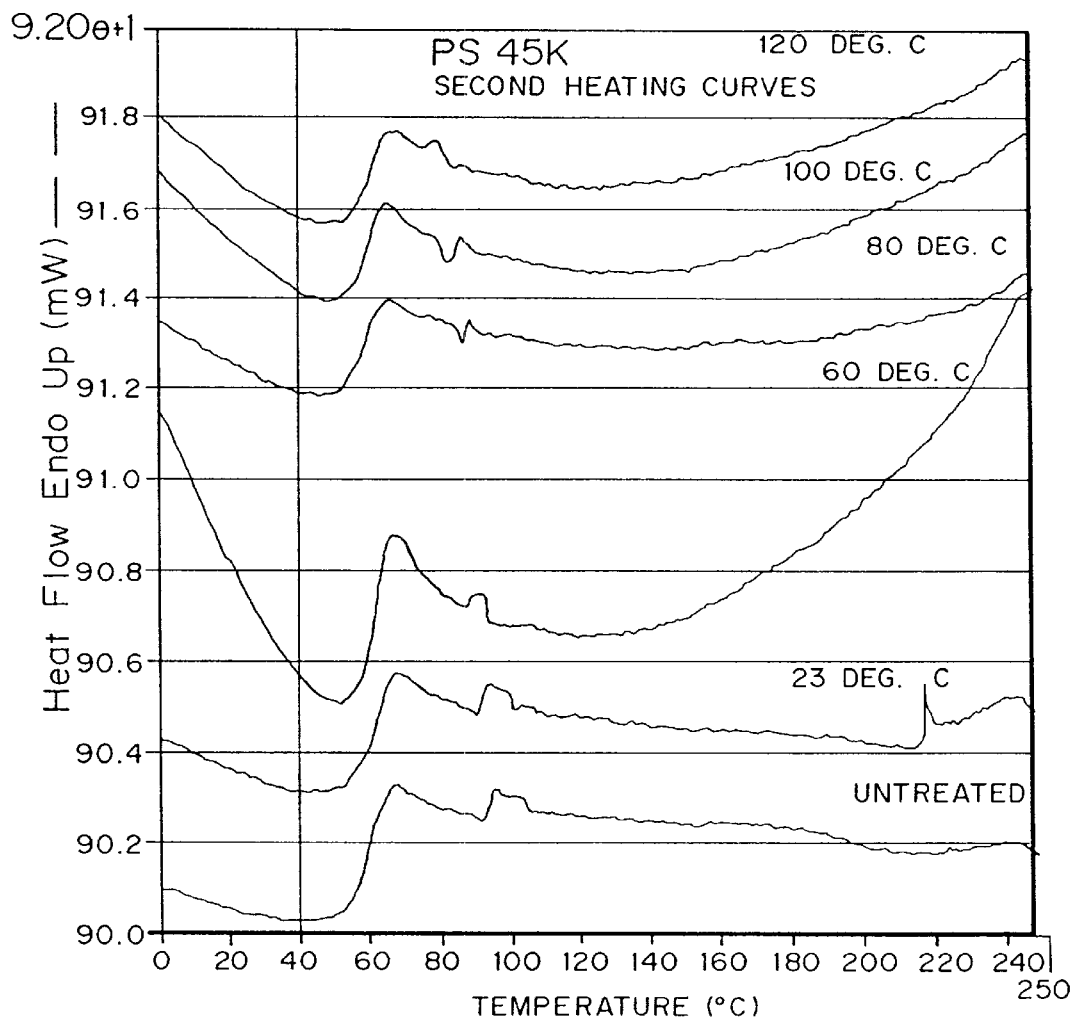

FIGS. 4A and 4B and Table 4 provide the DSC results for a similar treatment on a higher molecular weight polystyrene polymer (45 kDa). The first run of the thermal heating (FIG. 4A) revealed the same trend as shown with the lower molecular weight polystyrene. A thermal peak arises when the sample is heated above the glass transition temperature (60° C.). This transition disappeared after heating the sample to 250° C., as illustrated in FIG. 4B and Table 4. Although the glass transition lowers as the pressure was applied, the glass transition returned to its original value after the second heat, further indicating that the phase transition is induced with the application of pressure.

TABLE 4

DSC Results for Polystyrene (MW = 45 kDa) Films

| Temp. Treated (° C.)* | Tg (° C.) | Cp (J/g° C.) | Temp. Peak (° C.) | H (J/g) |
|---|---|---|---|---|
| Untreated (1) | 65.85 | .265 | — | — |
| Untreated (2) | 59.30 | .303 | — | — |
| 23 (1) | 64.65 | .211 | — | — |
| 23 (2) | 60.63 | .284 | — | — |
| 60 (1) | 61.995 | .262 | — | — |
| 60 (2) | 61.310 | .242 | — | — |
| 80 (1) | 52.427 | .151 | 68.866 | 2.67 |
| 80 (2) | 59.749 | .234 | — | — |
| 100 (1) | 54.223 | .226 | 76.700 | 3.188 |
| 100 (2) | 59.848 | .239 | — | — |
| 120 (1) | 54.626 | .175 | 78.866 | 1.988 |
| 120 (2) | 60.882 | .231 | — | — |

*(1) denotes first thermal run; (2) denotes second thermal run

EXAMPLE 6

Encapsulation of Perfume in Polycaprolactone Film

Formulation #1

A polymer blend was prepared by mixing 11.0 g of PCL (MW=72 kDa) (Aldrich Chemical Co, Lot 03218AF, Cat. #18160-9) and 4.0 g PCL (MW=32 kDa) (Scientific Polymers, Inc., Lot 7, Cat. #047) in a crucible while molten at 60° C. Fidji essence (0.2 ml) then was added to the polymer blend to give a perfume loading of 1.33% (w/w).

A portion (4.44 g) of the polymer mixture then was pressed between steel plates in a 4.2 cm×2.7 cm×0.4 mm mold at a pressure of 710 to 890 MPa (8 to 10 metric tons/cm$^2$) and allowed to cool for four minutes under pressure to form a film. Disks 8 mm in diameter were punched from the film with a borer, and a 0.1 mm center hole was drilled into each disk. Using polarizing light microscopy, the films appeared to be liquid crystalline.

Formulation #2

The remaining portion (10.56 g) of the polymer mixture from Formulation #1 was remelted and an additional 1.2 ml of Fidji essence was added to produce a loading of 12.7% (w/w). The melt-press-quench procedure described above for Formulation #1 was repeated with this formulation to yield a film, from which 8 mm disks with center holes were punched. Using polarizing light microscopy, the films appeared to be liquid crystalline.

Formulation #3

A third formulation was prepared by melting 10.0 g of PCL (MW=72 kDa) (Aldrich Chemical Co, Lot 03218AF, Cat. #18160-9) at 60° C. and adding 3.0 ml of Fidji essence to the polymer, to give a perfume loading of 29.1% (w/w). The melt-press-quench and punch procedure described above was repeated. The resulting films appeared to be liquid crystalline, using polarizing light microscopy.

Formulation #4

A fourth formulation was prepared by melting 2.0 g of PCL (MW=72 kDa) (Aldrich Chemical Co, Lot 03218AF, Cat. #18160-9) at 60° C. and adding 0.2 ml of Fidji essence to the polymer, to yield a perfume loading of 9.1% (w/w). The melt-press-quench procedure described above for Formulation #1 was repeated. A "blank" (no perfume) polymer film was also prepared using the same procedure. A "laminated film" was prepared by spreading 0.3 ml of Fidji essence between the blank and perfume-loaded films, subjecting the films to a pressure of 4 metric tons/cm$^2$ for one minute using a 0.8 mm thick mold. The laminants were then cooled under pressure for one minute, and 8 mm disks with center holes were punched out. Using polarizing light microscopy, the films appeared to be liquid crystalline.

Field Test of Perfume Devices

Formulations 1 through 4 were all field-tested as scent-releasing devices. Several women were asked to wear the perfume-loaded disks either on earrings or attached to necklaces. The disks were intended to release more perfume scent when heated from contact with the body. The scent of Formulations 2, 3, and 4 were evident even after three weeks and could be detected at a distance of two feet from the wearer. The devices maintained their scent after storage in a sealed container for more than 3 years.

FTIR Analysis of Perfume Formulations

Figure 5A:
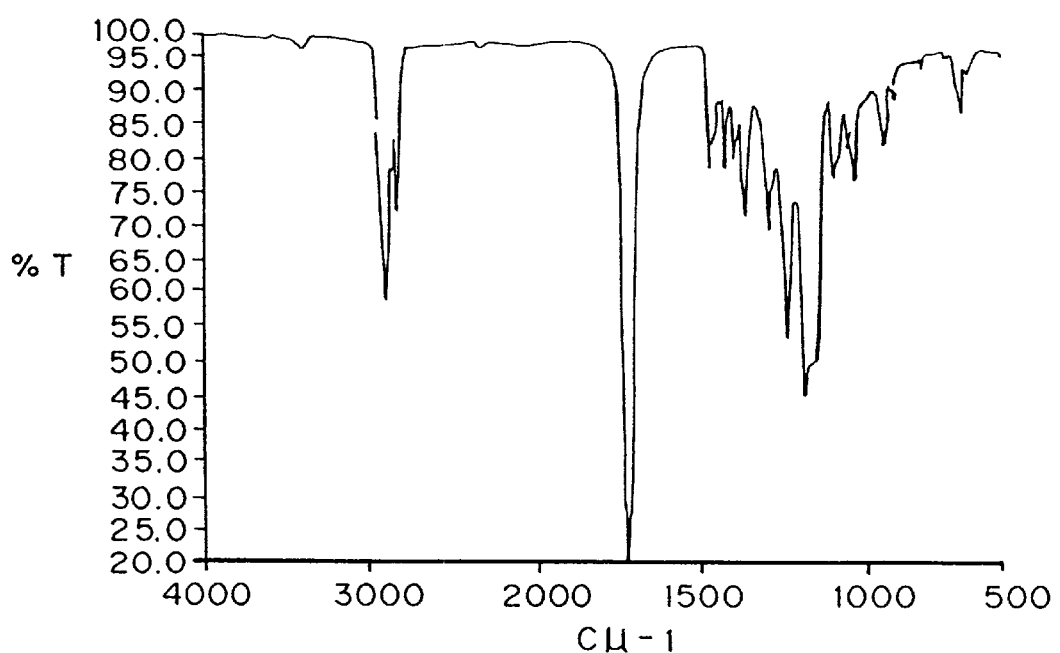
FIGS. 5A–5D are graphs showing Fourier Transform Infrared Spectroscopy (FTIR) for polycaprolactone ("PCL") film cast (5A), Fidji (5B), PCL-Fidji melt cast film that was pressed with high pressure (5C), and the PCL-Fidji melt cast film after three years.
Figure 5B:
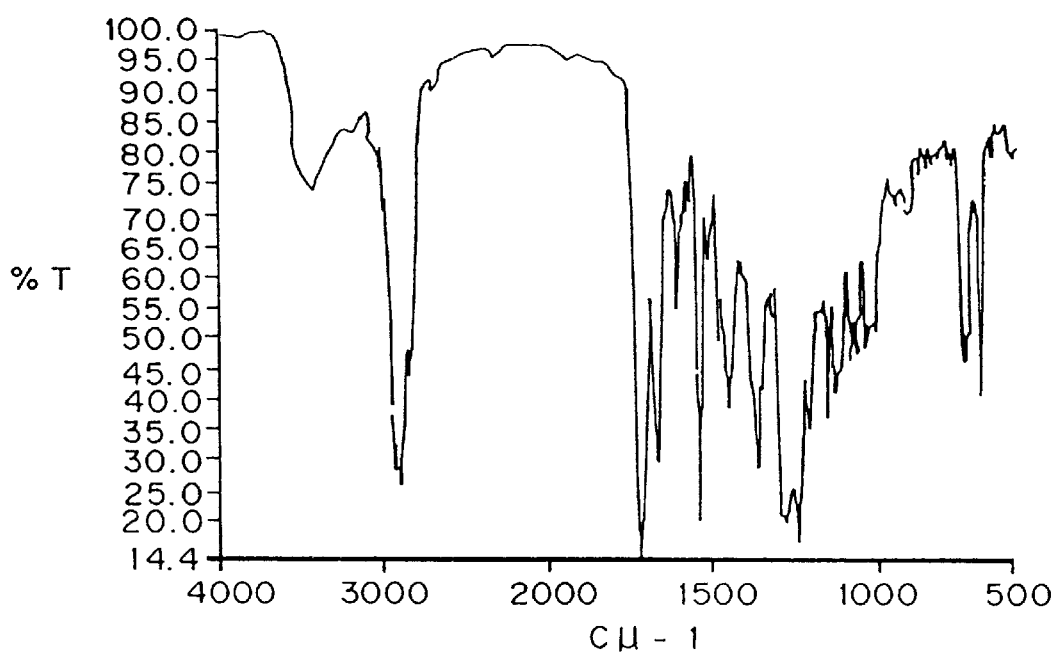
Figure 5C:
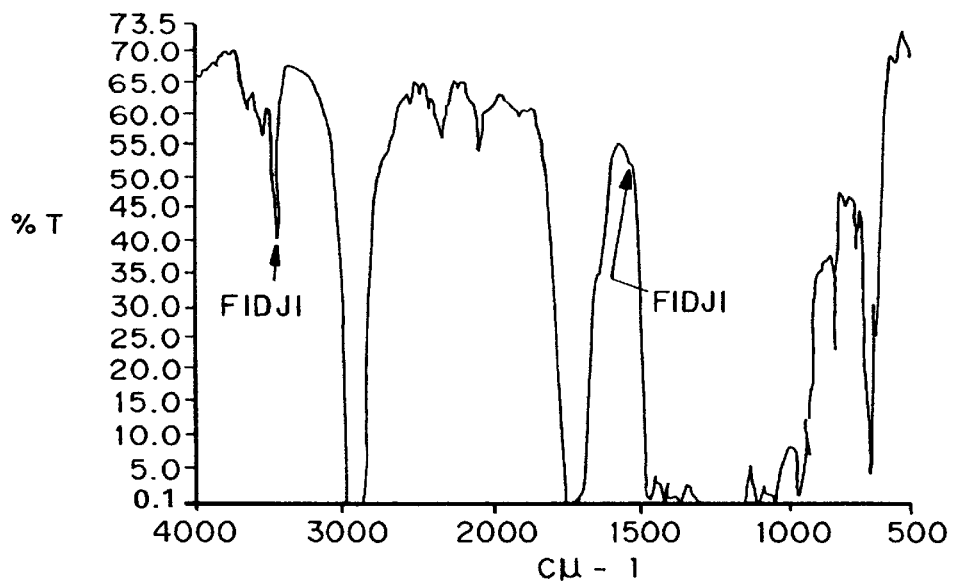
Figure 5D:
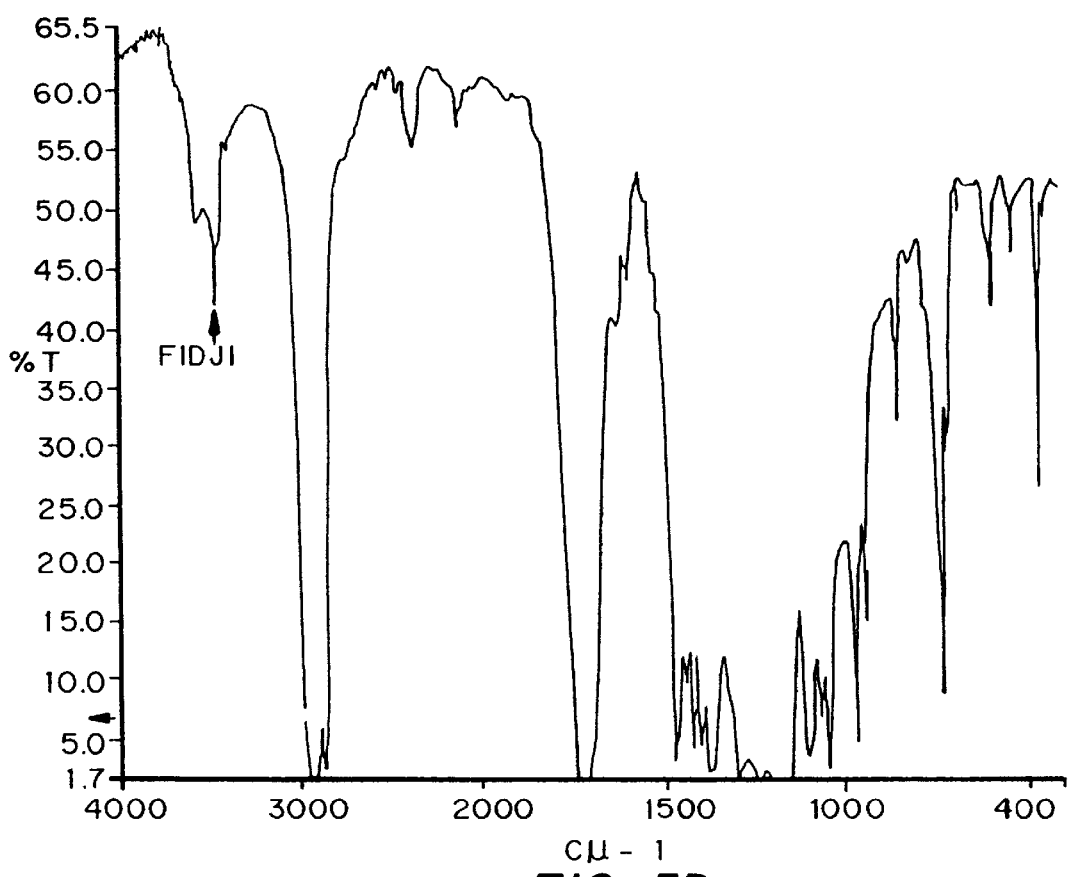

Formulation samples were prepared by solvent casting and analyzed three approximately three years later. Each sample contained the Fidji perfume even after 3 years, as confirmed by Fourier-Transform Infrared Spectroscopy (FTIR). FIGS. 5A–5D show the results of FTIR spectroscopy using a Perkin Elmer spectrometer model 1725x. The following four sample were analyzed: pure PCL (FIG. 5A), pure Fidji (FIG. 5B), PCL-Fifji melt cast and compressed (FIG. 5C), and a sample of PCL-Fidji kept at room temperature for three years (FIG. 5D). The last sample still retained the aroma of the perfume.

EXAMPLE 7

Effect of Pressure on PCL Film—X-Ray Analysis

Figure 6:
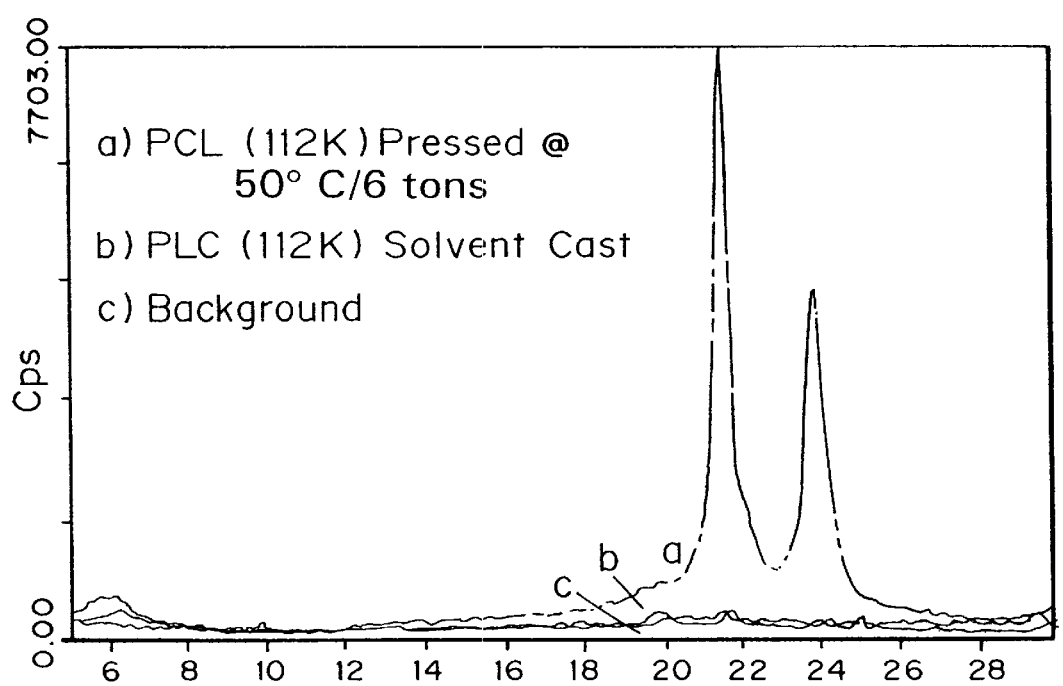
FIG. 6 is a graph showing X-ray powder diffraction of PCL (112 kD) film pressed at 6 tons and heated to 50° C. (a), PCL solvent cast film (b), and background (c).

X-ray analysis was performed on PCL film samples to assess the effect of pressure on the structure of the polymer. Two PCL film samples were prepared by dissolving PCL (MW=112 kDa) in methylene chloride and allowing the solvent to evaporate at room temperature (solvent cast). One of the sample was heated to 50° C. and compressed with 83 MPa (6 metric tons/cm$^2$) for a minute. Both samples were X-rayed using a Siemens Diffraktometer D5000. FIG. 6 shows the X-ray diffraction patterns for the two PCL films, one solvent cast only, and one solvent cast and heat/pressure treated. A comparison of the two patterns demonstrates that a more ordered structure was induced by the pressure and heating.

EXAMPLE 8

Effect of Pressure on PCL Film—Thermal Analysis

Figure 7:
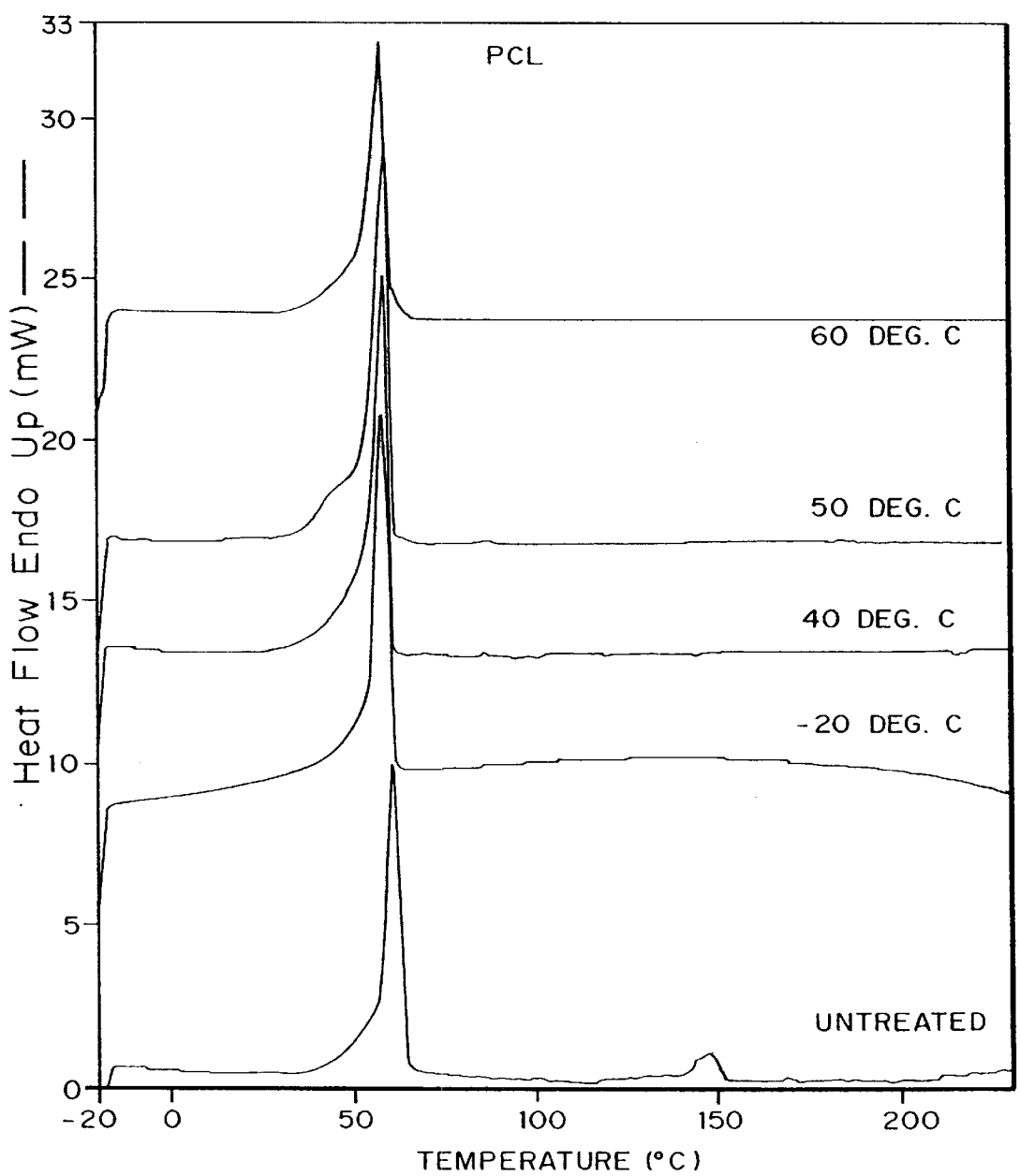
FIG. 7 is a graph showing thermal analysis by DSC of PCL pressed films. Temperatures (–20° C., 40° C., 50° C., and 60° C.) on the graphs indicate the heating temperature before pressure was applied.

DSC analysis, as described in Example 4, was performed on PCL (MW=72 kDa) film samples to assess the effect of pressure on the structure of the polymer. Film samples were produced; heated to 20, 40, 50, or 60° C.; and then subjected to a pressure of 10 metric tons/cm$^2$ for one minute. The samples were then analyzed by DSC, producing the results presented in FIG. 7 and Table 5. The major change in the thermal peak is shown to be the increase in the heat of fusion of the peak at about 60° C. These results demonstrate that the order in the polymer systems is increased as result of applying the pressure, i.e. a more ordered structure was induced by the pressure and heating.

TABLE 5

| DSC Results for PCL (MW = 2.5 kDa) Films | | |
|---|---|---|
| Treatment Temperature (° C.) | Peak at ° C. | H (J/g) |
| Untreated | 62.366 | 64.057 |
| 20 | 59.53 | 75.95 |
| 40 | 59.66 | 75.616 |
| 50 | 60.033 | 72.568 |
| 60 | 59.700 | 75.618 |

EXAMPLE 9

Effect of Pressure on PLA Film—X-Ray Analysis

X-ray analysis was performed on PLA film samples to assess the effect of pressure on the structure of the polymer. Three PLA (MW=130 kDa) film samples were prepared as described above. The first PLA sample was heated to 100° C. and cooled room temperature at atmospheric pressure. No LC morphology was observed when the first sample was analyzed using polarized light. X-ray diffraction analysis was performed as described in Example 7. The diffraction pattern for the first sample is shown in FIG. 8A.

The second and third samples were heated to 100° C. and compressed with 890 MPa (10 metric tons/cm$^2$) for two minutes. Optical microscopy revealed dispersed LC properties in the second sample, and LC in the entire field of the third sample. X-ray diffraction patterns for samples two and three are shown in FIGS. 8B and 8C. A new diffraction peak appeared at about 17° in the samples that had LC morphology. Additional diffraction peaks also were observed, which appear to be a result of structural changes occurring after application of pressure. The morphology of these samples were retained for at least three years.

EXAMPLE 10

Effect of Pressure on Polystyrene Films—X-Ray Analysis

X-ray analysis was performed on polystyrene (PS) film samples to assess the effect of pressure on the structure of the polymer. Three PS films were prepared by heating each sample to about 80° C. and applying 890 MPa (10 tons/cm$^2$) of pressure for 2 minutes. Each film had a different molecular weight: 2.5 kDa, 50 kDa, or 250 kDa. X-ray analysis was performed as described in Example 7.

Figure 9A:
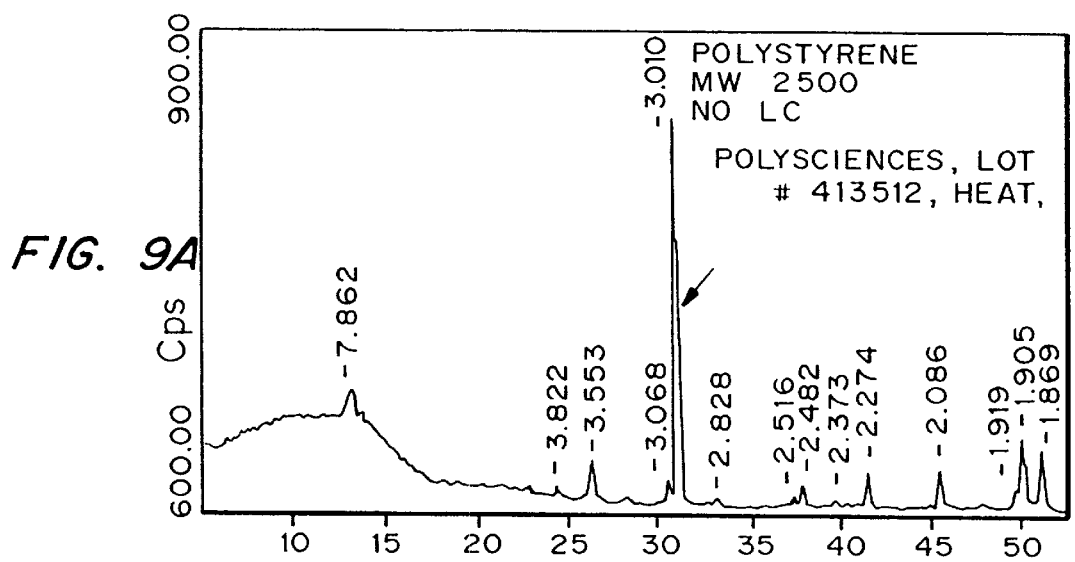
FIGS. 9A–9C are graphs showing X-ray powder diffraction of polystyrene film (2.5 kDa) for no LC (9A), LC (9B), and LC-crushed sample (9C). Arrows indicate diffraction of the clay material on which the film was supported.
Figure 9B:
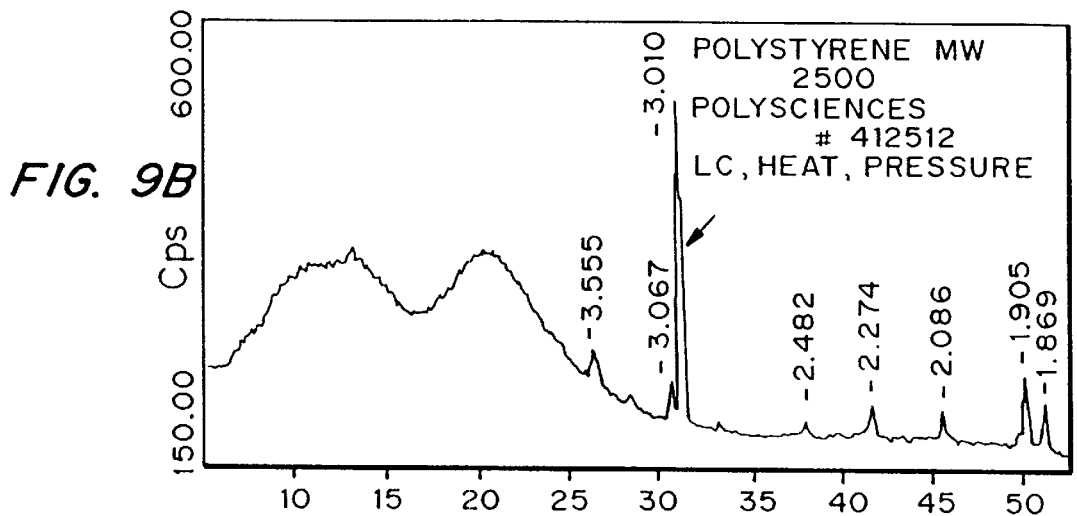
Figure 9C:
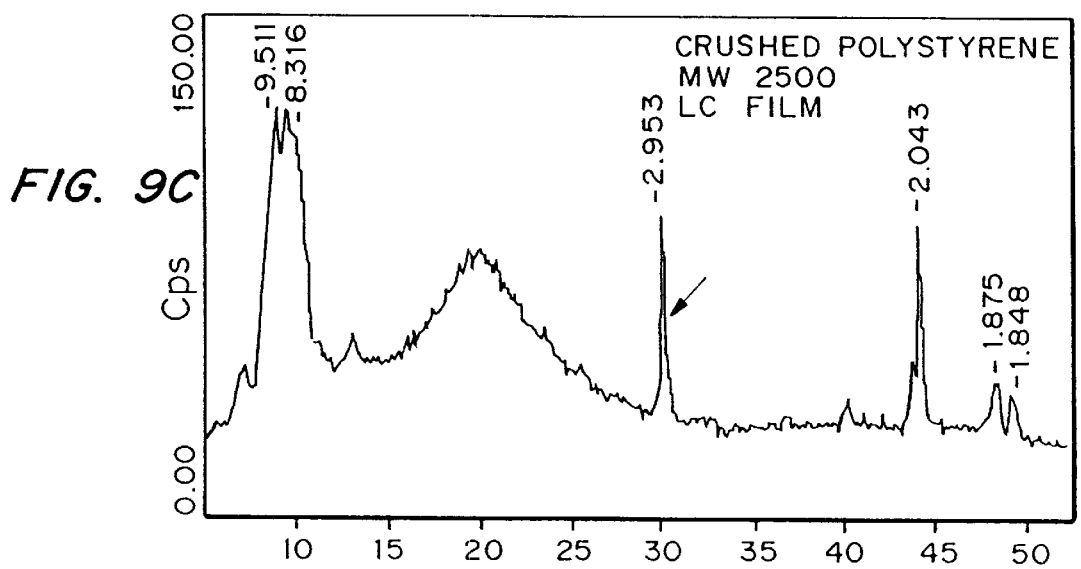

FIGS. 9A–9C show the X-ray diffraction patterns for the 2.5 kDa PS sample. FIG. 9A shows the X-ray diffraction pattern for a sample that was heated to 90° C. and subjected to a light pressure of 0.5 metric tons per 2 cm$^2$ for 2 minutes. No LC structure was observed. FIG. 9B shows the x-ray diffraction pattern for a 2.5 kDa sample that was heated to 80° C. and subjected to a pressure of 10 metric tons per 2 cm$^2$ for 2 minutes. The X-ray diffraction patterns showed LC structure and new broad peaks between 10 to 25°. The same sample then was crushed with a mortar and pestle and re-analyzed, as shown in FIG. 9C. A new diffraction is observed at 10°, providing strong evidence that a new phase is being created under these conditions. The morphology was maintained for approximately four years at room temperature, since the crushed sample polarized light showed the specific Schlieren structure during that period of time.

FIGS. 10A–10D show the X-ray diffraction patterns for the 250 kDa PS sample. The diffraction pattern for the untreated sample revealed only an amorphous hump (FIG. 10A). The diffraction pattern for the sample subjected only to elevated pressure (FIG. 10B) was substantially identical to that for the untreated sample. The diffraction pattern for the sample subjected only to elevated temperature at atmospheric pressure (FIG. 10C) also was substantially identical to that for the untreated sample. The diffraction pattern for the sample subjected to both elevated temperature and pressure (FIG. 10D), however, revealed a more ordered structure, indicative of LC properties. The Figures collectively demonstrate that both heat and pressure are necessary to induce the LC phase in the polymer.

Figure 11A:
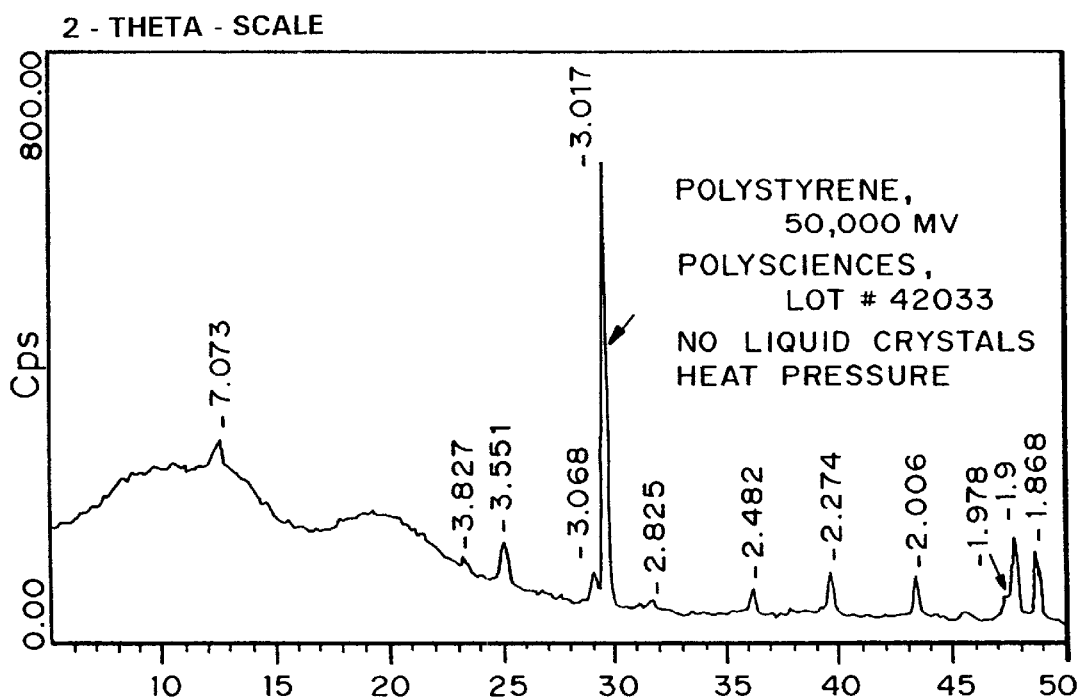
FIGS. 11A–11B are graphs showing X-ray powder diffraction of polystyrene film (50 kDa) for pure polymer, no LC (11A); and pure polymer treated with heat and pressure, LC (11B). Arrows indicate diffraction of the clay material on which the film was supported. Differentiate heat and pressure between FIGS. 11a & 11b.
Figure 11B:
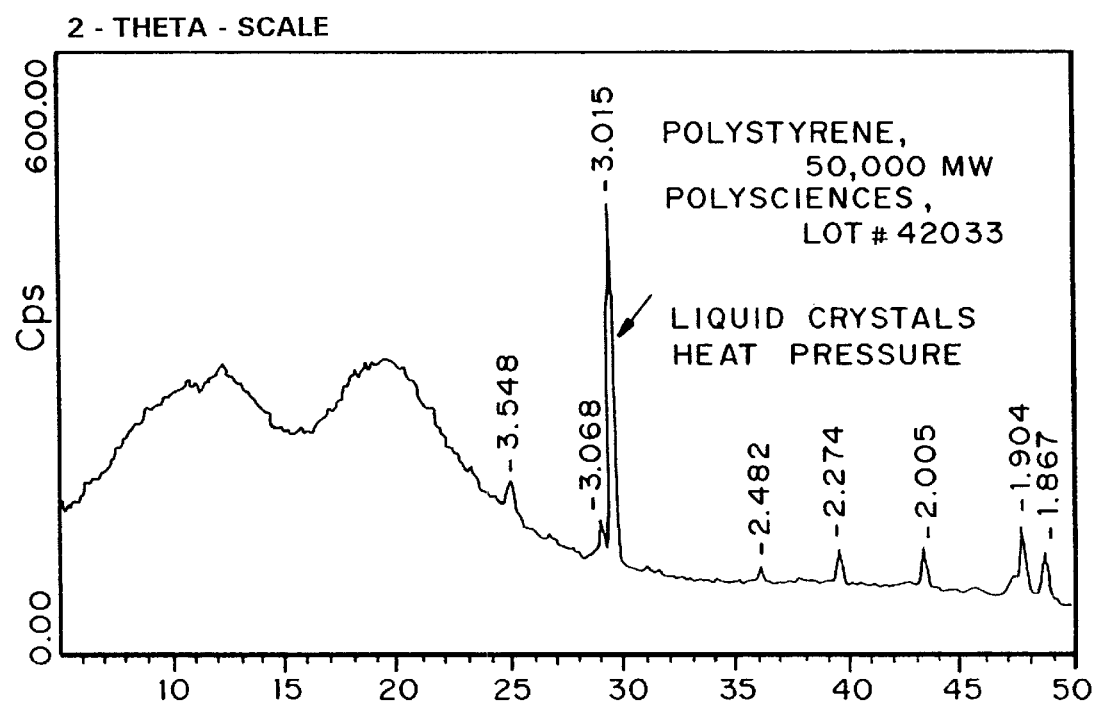

FIGS. 11A and 11B show the X-ray diffraction patterns for the 50 kDa PS samples that were prepared by heating to 20° C. and applying a pressure of 10 metric tons per 2 cm² for 2 seconds. The diffraction pattern in FIG. 11B shows two broad peaks at 10 to 20°.

EXAMPLE 11

Effect of Pressure on Polyethylene Films: X-Ray Analysis

Figure 12A:
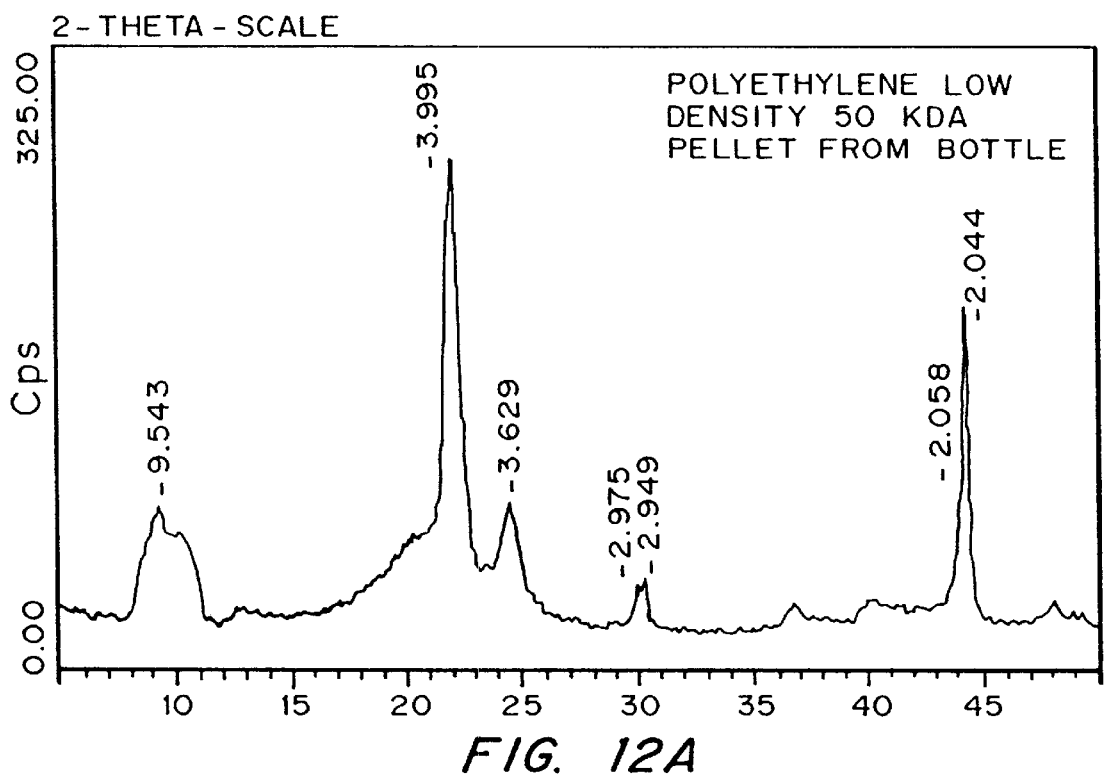
FIGS. 12A–12B are graphs showing X-ray powder diffraction of low density polyethylene film ("LDPE") (50 kDa) for pure polymer, no LC pellet (12A); and pure polymer treated with heat and pressure, LC (12B).
Figure 12B:
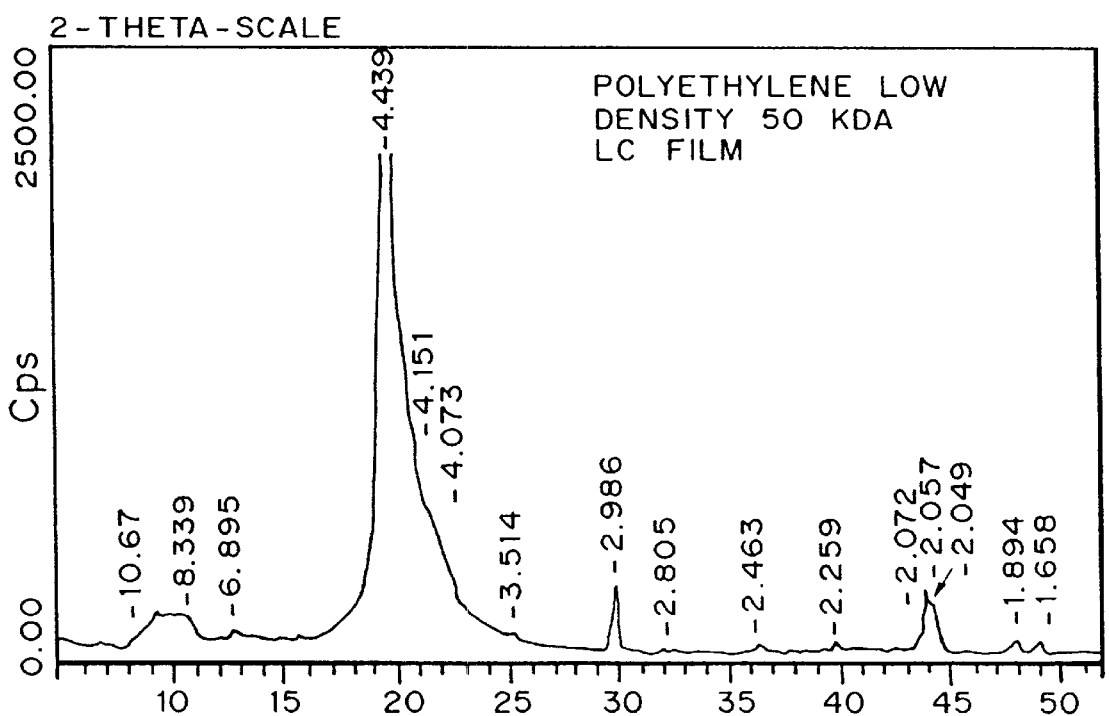

FIGS. 12A and 12B show X-ray diffraction patterns for low density polyethylene (50 kDa) in the form of am untreated pellet (as supplied by the manufacturer) and as a (heat and pressure) treated film in the LC state, respectively. The morphology of the LC sample is substantially different from that of the original polymer.

EXAMPLE 12

Effect of Pressure on Polyanhydride Films: X-Ray Analysis

FIG. 13 shows X-ray diffraction patterns for a sample made of polyanhydride poly(carboxy-methoxy-propane-co-sebacic) anhydride 20:80. This polymer has a glass transition temperature of about 45° C. and melting temperature of about 86° C. One sample was untreated. Other samples were heated to 60, 70, or 75° C., and pressed as described in Example 10. The untreated polymer (no applied pressure) has four typical peaks in the region of 19 to 28°. The 75° C. sample demonstrated the same peaks but with lower intensity. The 70 and 75° C. samples showed the same four peaks but the lateral orientation became more pronounced. These patterns and the LC nature of those sample support the conclusion that an LC structure is produced.

EXAMPLE 13

Crystallinity Reduction in High Density Polyethylene

HDPE Film Preparation

High density polyethylene (HDPE) (Scientific Polymers Cat. #141, Lot 15) in the form of pellets was used for this study. Eight pellets of HDPE were assembled on a glass slide in a pattern of concentric circles with each pellet about 0.3 cm in any direction from neighboring pellets. This assembly, along with another free glass slide, was placed on a programmable hot plate set at 150° C. When the pellets began to melt, they were sintered together by pressing down on them with the free glass slide. The resulting flat, transparent film was removed immediately from the hot plate and allowed to cool between the glass slides. Upon cooling, the HDPE film regained its original opaque color, and the circular film was removed from between the glass slides.

Four additional films were similarly prepared. The films had a diameter of about 2 cm. Four films subsequently were treated to induce an LC state, and one film (control) was left untreated.

LC Induction Treatment

Four of the HDPE film were each placed on a thin aluminum sheet, and the resulting HDPE/Al assembly then was placed onto a programmable hotplate, along with a second, empty aluminum sheet. The programmable hot plate was set at 60, 80, 100, and 127° C., respectively, for each of the films. The assembly was allowed to equilibrate at the set temperature for about half a minute, and then the HDPE film was sandwiched between the aluminum sheets and the assembly pressurized at 890 MPa (10 tons/cm²) for one minute using a Wabash Hydraulic Press set at room temperature.

Determination of Crystallinity

All of the films (untreated and processed at 60, 80, 100, and 127° C.) were analyzed using a D5000 Powder Defractometer X-ray machine with the settings shown in Table 6 below.

TABLE 6

| Powder X-ray Diffraction Settings for HDPE Series | |
|---|---|
| Step drive: | Normal, coupled |
| Step mode: | Continuous scan |
| Step time: | 2.0 s |
| Step size: | 0.020° |
|  | 20 — Sample |
| Start position: | 0.00 — 0.00 |
| Stop position: | 70.00 — 35.00 |
| Tube current: | 30~35 mA |
| Tube voltage: | 40 kV |
| Measurement channel: | 1 |
| Detector voltage: | 875 V |
| Amplifier: | 2 |
| Base level: | 0.50 V |
| Upper level: | 2.50 V |
| Adjustment: | Automatic |
| x scale: | 0.00° /cm |
| y scale: | 1000. Cps/cm |

The diffraction spectra that were obtained are shown in FIGS. 14A–E. The two largest peaks, occurring at 2θ=21.5 and 24.0, respectively, were selected to determine Full Width at Half Maximum Peak Height ("FWHM") using the x-ray machine. The results are shown in the graphs in FIGS. 15A–B and in the bar graph in FIG. 16. FIG. 15a demonstrates the total area under the curve and FIG. 15b demonstrates the amorphous area.

The data obtained from the x-ray analysis was converted to a computer spreadsheet and graphs were constructed from the spreadsheet. The graphs were then copied in to PhotoShop on a Macintosh computer (Microsoft Paint on IBM) and saved as a PICT file (256 Color Bitmap for Microsoft Paint). This file was then opened in the program NIH Image (Scion in IBM) and the following areas (as shown in FIGS. 15A–B) were calculated in pixels:

1. Total area under curve ($A_T$);
2. Total area under amorphous region ($A_A$); and
3. Total area under baseline of curve ($A_B$).

Percent crystallinity was then determined using the following formula:

$$\frac{\text{Area of crystalline region}}{\text{Total area under curve}} = \frac{(A_T - A_A) \times 100}{A_T - A_A} \qquad (EQ.\ 1)$$

FIG. 17 shows that percent crystallinity increased from the untreated film to the film processed at 80° C. A decrease in the percent crystallinity was observed at 100° C. It is believed that 100° C. is the ideal (or near ideal) temperature for inducing the LC phase in HDPE, based on earlier DSC data collected. The results here show that the treated HDPE film has a lower percent crystallinity, confirming the hypothesis that inducing the LC phase by the method described herein can reduce the crystallinity of a polymer.

EXAMPLE 14

Crystallinity Reduction in Polystyrene

A series of thin films were prepared from Polystyrene 45K (MW=45 kDa) (Scientific Products Inc. Cat 400, Flakes CAS3 90003-53-6), using the methods described in Example 13. The raw material was in the form of yellowish flakes about 2 mm thick and about 102 $cm^2$ in area, but in an irregular shape. The temperature series was created by heating the polymer samples on a Cole Parmer, 0446444-series Digital Hot Plate.

Polystyrene (PS) samples were heated to 25, 60, 80, 100, or 120° C. and immediately pressurized at 890 MPa (10 tons/$cm^2$) for one minute using a Wabash Hydraulic Press. The percent crystallinity was determined as described in Example 13. FIG. 18 shows that the crystallinity of the polymer samples was decreased when the LC state was induced in the polymer above its Tg, which is about 100° C. The lowest crystallinity was obtained for the sample heated to 120° C.

EXAMPLE 15

Crystallinity in PCL as Function of Process Temperature

Five pieces of PCL film were made by melting the PCL polymer on a hotplate and then flattening the melted polymer under pressure between two glass plates. Upon cooling, four of the films were reheated to 20, 40, 50, and 60° C., respectively, and immediately pressurized to 10 metric tons/$cm^2$ using a Wabash floor press for one minute. The remaining film was pressurized without reheating (i.e. unprocessed). The resulting five films were then analyzed on a powder X-ray Defractometer. The spectra were used to calculate percent crystallinity of each film using the ratio of the crystalline and total areas as shown in FIGS. 19A–19B. From the data, there appears to be a decrease in percent crystallinity for film processed at 40° C., which is below the melt temperature of 60° C. and suggests that the liquid crystal phase of this polymer can be induced optimally at about 40° C.

Those skilled in the art will recognize, or be able to ascertain using no more than routine experimentation, many equivalents to the specific embodiments of the invention described herein. Such equivalents are intended to be encompassed by the following claims.

We claim:

1. A composition comprising
   a non-mesogenic polymer which exhibits liquid crystalline properties at a temperature below the glass transition temperature of the polymer, wherein a liquid crystalline state is stable at atmospheric conditions and room temperature, and
   an encapsulated agent.

2. The composition of claim 1 wherein the encapsulated agent is an active agent for use in medical or pharmaceutical applications.

3. The composition of claim 1 wherein the encapsulated agent is selected from the group consisting of perfumes, flavoring agents, coloring agents, sunscreens, and pesticides.

4. A method for release of an encapsulated agent comprising
   providing to a release site a composition comprising
      a) a polymer which exhibits liquid crystalline properties at a temperature below the glass transition temperature of the polymer, wherein a liquid crystalline state is stable at atmospheric conditions and room temperature, and
      b) an agent encapsulated in the polymer.

5. The method of claim 4 wherein the agent is an active agent for use in medical or pharmaceutical applications.

6. The method of claim 4 wherein the agent is selected from the group consisting of scents, flavoring agents, coloring agents, sunscreens, and pesticides.

7. An article for the release of an encapsulated agent comprising a polymer which exhibits liquid crystalline properties at a temperature below the glass transition temperature of the polymer and the agent encapsulated in the polymer, wherein the polymer is in a form selected from the group consisting of films, laminants, coatings, slabs, microparticles, containers for packaging of food or drugs, and orthopedic or prosthetic devices, and wherein a liquid crystalline state is stable at atmospheric conditions and room temperature.

8. A monolithic composition for controlled delivery of an active agent made using a process comprising
   providing a polymer which contains substantially no liquid crystalline phase,
   heating the polymer above its glass transition temperature and then subjecting the polymer to a pressure sufficient to induce a liquid crystalline phase in at least a portion of the polymer, and
   combining the polymer with the active agent,
   wherein the liquid crystalline phase is stable at atmospheric conditions and room temperature.

9. The composition of claim 8 wherein the polymer is water-insoluble.

10. The composition of claim 8 wherein the polymer is water-soluble.

11. The composition of claim 8 wherein the polymer is combined with the active agent to form a mixture before the step of inducing the liquid crystalline phase.

12. The composition of claim 8 wherein the polymer is combined with the active agent after the step of inducing the liquid crystalline phase.

13. The composition of claim 8 wherein the mixture of polymer and active agent is heated above the melting temperature of the active agent and then cooled before the step of inducing the liquid crystalline phase.

* * * * *